United States Patent
Hagai et al.

(10) Patent No.: US 7,515,635 B2
(45) Date of Patent: Apr. 7, 2009

(54) MOVING PICTURE CODING METHOD AND A MOVING PICTURE DECODING METHOD

(75) Inventors: Makoto Hagai, Moriguchi (JP); Shinya Kadono, Nishinomiya (JP); Satoshi Kondo, Yawata (JP); Kiyofumi Abe, Kadoma (JP)

(73) Assignee: Panasonic Corporation, Osaka (JP)

( * ) Notice: Subject to any disclaimer, the term of this patent is extended or adjusted under 35 U.S.C. 154(b) by 1034 days.

(21) Appl. No.: 10/480,932

(22) PCT Filed: Apr. 16, 2003

(86) PCT No.: PCT/JP03/04806

§ 371 (c)(1),
(2), (4) Date: Dec. 16, 2003

(87) PCT Pub. No.: WO03/090474

PCT Pub. Date: Oct. 30, 2003

(65) Prior Publication Data

US 2004/0146105 A1  Jul. 29, 2004

(30) Foreign Application Priority Data

Apr. 19, 2002  (JP)  ............. 2002-118484

(51) Int. Cl.
 H04N 7/12 (2006.01)
 H04N 11/02 (2006.01)
 H04N 11/04 (2006.01)
 H04B 1/66 (2006.01)
(52) U.S. Cl. ............................ 375/240.12
(58) Field of Classification Search ........... None
See application file for complete search history.

(56) References Cited

U.S. PATENT DOCUMENTS 5,386,234 A  1/1995  Veltman et al.
5,926,225 A * 7/1999  Fukuhara et al. ......... 348/416.1

(Continued)

FOREIGN PATENT DOCUMENTS

JP  05-137131  6/1993

(Continued)

OTHER PUBLICATIONS

T. Fukuhara, entitled "*Very Low Bit-Rate Video Coding with Block Partitioning and Adaptive Selection of Two Time-Differential Frame Memories*", IEEE Transactions on Circuits and Systems for Video Technology, IEEE, Feb. 1997, vol. 7, No. 1, p. 212-220.
"Working Draft No. 2, Revision 2 (WD-2)" Document JVT-B118R2, Jan. 29, 2002, pp. 1-100, XP001086630.

(Continued)

*Primary Examiner*—Nhon T Diep
(74) *Attorney, Agent, or Firm*—Wenderoth, Lind & Ponack, L.L.P.

(57) ABSTRACT

A moving picture coding apparatus includes a motion estimation unit for performing motion estimation by fixing the one of two reference pictures as a reference picture indicated by an inputted default reference picture number DefRefNo and a variable length coding unit for performing variable length coding on coded residual data ERes, a prediction type PredType, a reference picture number RefNo2 and motion vectors MV1, MV2 on a block-by-block basis, and outputting them as coded moving picture data Str.

2 Claims, 23 Drawing Sheets

U.S. PATENT DOCUMENTS

| | | | |
|---|---|---|---|
| 6,088,485 A | | 7/2000 | Kadono |
| 6,704,358 B1 * | | 3/2004 | Li et al. .................. 375/240.02 |
| 6,859,559 B2 * | | 2/2005 | Boon et al. .................. 382/238 |
| 7,126,993 B2 * | | 10/2006 | Kitamura et al. ....... 375/240.26 |
| 2001/0014178 A1 | | 8/2001 | Boon |

FOREIGN PATENT DOCUMENTS

| | | |
|---|---|---|
| JP | 10-224795 | 8/1998 |
| JP | 10-271517 | 10/1998 |
| JP | 2001-036910 | 2/2001 |
| JP | 2001-268581 | 9/2001 |
| WO | 01/33864 | 5/2001 |

OTHER PUBLICATIONS

Fukuhara, T. et al.: "Very Low Bit-rate Video Coding with Block Partitioning and Adaptive Selection of Two Time-Differential Frame Memories" IEEE Transactions On Circuits and Systems For Video Technology, IEEE Service Center, Piscataway, NJ, US, vol. 7, No. 1, Feb. 1997, pp. 212-220, XP000678892.

Karczewicz, M. et al.: "A Proposal For SP-frames: VCEG-L27" ITU Telecommunications Standardization Sector VCEG-L27, XX, XX, Jan. 9, 2001, pp. 1-9, XP002287038.

ISO/IEC 14496-2:1999(E) Information technology—coding of audio-visual objects Part 2: Visual (Dec. 1, 1999) pp. 1-331.

Japanese Office Action (with English translation) issued Jul. 1, 2008 in Japanese Application No. 2003-105765.

* cited by examiner

MOVING PICTURE CODING METHOD AND A MOVING PICTURE DECODING METHOD

TECHNICAL FIELD

The present invention relates to a method of coding and decoding moving picture data as well as a recording medium on which a program for executing these methods as software is recorded.

BACKGROUND ART

In recent years, along with a development of multimedia applications such as picture, audio and text, it has become universal to handle all sorts of media in an integrated way. However, an information compression technique for data is dispensable for its storage and transmission since a digitalized picture contains an enormous amount of data. On the other hand, a standardization of compression techniques is also important for interoperating compressed picture data. The standards of picture compression techniques include H.261, H.263 established by the ITU (International Telecommunication Union) and MPEG (Moving Picture Experts Group)-1, MPEG-2 and MPEG-4 established by the ISO (International Organization for Standardization).

An inter-picture prediction which accompanies motion compensation can be cited as a technique shared among these moving picture coding methods. In the motion compensation based on these moving picture coding methods, a picture of an input image is divided into blocks, each of which has a predetermined size, and a predictive image is generated for each block using motion vectors, respectively indicating a motion between pictures. The following predictions are employed for the inter-picture prediction according to the MPEG: a forward prediction for a prediction using a single picture whose display time is earlier than that of a current picture to be coded; a backward prediction for a prediction using a single picture whose display time is later than that of the current picture; a bi-directional prediction for a prediction using two pictures, that is, one picture whose display time is earlier than the current picture and the other picture whose display time is later than that of the current picture (see reference, for example, ISO/IEC 14496-2:1999(E) Information technology—coding of audio-visual objects Part 2: Visual (1999-12-01) pp 150 7.6.7 Temporal prediction structure).

In the MPEG, a reference picture to be used is determined uniquely depending on the type of inter-picture prediction and an arbitrary reference picture cannot be selected. In the meantime, a bi-directional prediction which is expanded so that two arbitrary reference pictures can be selected out of a plurality of coded pictures stored in a picture memory regardless of the display time of the current picture is taken under consideration in the H.264 which is presently under the process of standardization by the ITU.

FIG. 1 is a block diagram showing a structure of a moving picture coding apparatus according to the H.264. The conventional moving picture coding apparatus shown in FIG. 1 is an apparatus for executing a moving picture coding method which allows a selection of two arbitrary reference pictures from plural coded pictures when the inter-picture prediction is operated.

This moving picture coding apparatus includes, as shown in FIG. 1, a motion estimation unit 301, a pixel interpolation unit 102, a subtractor 103, a picture coding unit 104, a picture decoding unit 105, an adder 106, a variable length coding unit 302, a multi-picture buffer 108 and a switch 109.

The moving picture coding apparatus divides an inputted image data Img into blocks and performs processing for each of the blocks. The subtractor 103 subtracts a predictive image data Pred from the image data Img inputted to the moving picture coding apparatus and outputs it as residual data Res. The picture coding unit 104 performs picture coding processing such as orthogonal transformation and quantization on the inputted residual data Res and outputs it as coded residual data ERes including quantized orthogonal transformed coefficients. The picture decoding unit 105 performs picture decoding processing such as inverse quantization and inverse orthogonal transformation on the inputted coded residual data ERes and outputs it as decoded residual data DRes. The adder 106 adds the decoded residual data DRes to the predictive image data Pred and outputs it as reconstructed image data Recon. Out of the reconstructed image data Recon, the data having the possibility to be used for reference in the subsequent inter-picture prediction is stored in the multi-picture buffer 108.

Here, an interpolation prediction using two reference pictures performed by the conventional moving picture coding apparatus is described with reference to FIG. 2. FIG. 2 is a conceptual diagram of the interpolation prediction using plural reference pictures. Here, a picture Pic is a current picture to be coded. Pictures FwRef1~FwRef3 represent coded pictures respectively having a display time earlier than that of the current picture whereas pictures BwRef1~BwRef3 represent coded pictures respectively having a display time later than that of the current picture. A block Blk1 is predicted using pixel values in a reference block RefBlk11 included in the picture FwRef3 whose display time is earlier than that of the current picture Pic and pixel values in a reference block RefBlk12 included in the picture BwRef1 whose display time is later than that of the current picture Pic. A block Blk2 is predicted using pixel values in reference blocks RefBlk21 and RefBlk22 included in two pictures FwRef1 and FwRef2 respectively having a display time earlier than that of the current picture. A block Blk3 is predicted using pixel values in reference blocks RefBlk31 and RefBlk32 included in two pictures BwRef1 and BwRef2 respectively having a display time later than that of the current picture. Namely, a result of interpolating pixels in the areas corresponding to the two reference blocks using a predetermined method such as the one using an average value is considered to be a predictive image. The characteristics of the conventional moving picture coding apparatus is to perform prediction on a block-by-block basis using arbitrary two reference pictures as shown in FIG. 2. A method for predicting with the use of two arbitrary reference pictures as described above is called "plural reference picture interpolation prediction" hereinafter. The prediction method includes a method in which a block included in a single arbitrary picture is used directly as a predictive image and the intra-picture prediction other than the method of generating a predictive image using the pixel interpolation as described above, and it is possible to switch the prediction method on a block-by-block basis.

The motion estimation unit 301 determines a prediction type for the block, reference pictures and motion vectors to be used for inter-picture prediction performed on the inputted current block to be coded and outputs a prediction type PredType, reference picture numbers RefNo1, RefNo2, and motion vectors MV1, MV2. The motion estimation 301 outputs two picture numbers and two motion vectors since two reference pictures are selected when plural reference picture interpolation prediction is operated. Here, the multi-picture buffer 108 outputs a reference block RefBlk1 corresponding to the reference picture number RefNo1 and the motion vector MV1 and a reference block RefBlk2 corresponding to the reference picture number RefNo2 and the motion vector MV2. The pixel interpolation unit 102 performs interpolation for the pixels with respect to the two reference blocks Ref-Blk1 and RefBlk2 using average value and outputs it as an interpolated block RefPol. On the other hand, in the case of using an inter-picture prediction other than a plural reference picture interpolation prediction, the motion estimation unit 301 selects a single reference picture, and therefore, outputs a single reference picture number RefNo1 and a single motion vector MV1. In this case, the multi-picture buffer 108 outputs a reference block RefBlk with respect to the reference picture number RefNo1 and the motion vector MV1.

When the prediction type determined by the motion estimation unit 301 indicates a plural reference picture interpolation prediction, the switch 109 is switched to a "1" side and the interpolated block RefPol is used as a predictive image data Pred. When the prediction type PredType indicates an inter-picture prediction other than a plural reference picture interpolation prediction, the switch SW11 is switched to a "0" side and the reference block RefBlk is used as a predictive image data Pred. The variable length coding unit 302 performs variable length coding on the coded residual data ERes, the prediction type PredType, the reference picture numbers RefNo1, RefNo2 and the motion vectors MV1, MV2 and then outputs them as coded moving picture data Str0.

FIG. 3 is a conceptual diagram of a data format of coded moving picture used by the conventional moving picture coding apparatus. Coded data equivalent to a single picture, Picture, is composed of coded data equivalent to a single block, Block, where each block composes a picture, and the like. Here, the coded data equivalent to a single block, Block, presents coded data of a block on which a plural reference picture interpolation prediction is performed, and includes the reference picture numbers RefNo1, RefNo2, the motion vectors MV1, MV2, with respect to the two reference pictures, the prediction mode PredType, and the like, in the coded data.

FIG. 4 is a block diagram showing a structure of the conventional moving picture decoding apparatus. The moving picture decoding apparatus includes, as shown in FIG. 4, a variable length decoding unit 601, a motion compensation unit 602, a picture decoding unit 404, an adder 405, a pixel interpolation unit 406, a multi-picture buffer 407 and a switch 408.

The variable length decoding unit 601 performs variable length decoding on the inputted coded image data Str0 and outputs the coded residual data ERes, the motion vectors MV1, MV2, the reference picture numbers RefNo1, RefNo2 and the prediction type PreType. The picture decoding unit 404 performs picture decoding processing such as inverse quantization and inverse orthogonal transformation on the inputted coded residual data ERes and outputs decoded residual data DRes. The adder 405 adds the decoded residual data DRes to the predictive image data Pred and outputs it as decoded image data DImg outside the moving picture decoding apparatus. The multi-picture buffer 407 stores the decoded image data DImg for inter-picture prediction.

The motion compensation unit 602 outputs reference picture numbers NRefNo1, NRefNo2 of the reference blocks necessary for inter-picture prediction according to the prediction type PredType as well as the motion vectors MV1, MV2 and instructs the multi-picture buffer 407 to output the reference blocks. When the prediction type PredType indicates a plural reference picture interpolation prediction, the multi-picture buffer 407 outputs the reference block RefBlk1 corresponding to the reference picture number NRefNo1 and the motion vector NMV1 as well as the reference block RefBlk2 corresponding to the reference picture number NRefNo2 and the motion vector NMV2. The pixel interpolation unit 406 interpolates the pixels in the two reference blocks RefBlk1 and RefBlk2 using the average value. On the other hand, when the prediction type PredType indicates an inter-picture prediction method other than a plural reference picture interpolation prediction, the multi-picture buffer 407 outputs the reference block RefBlk corresponding to the reference picture number NRefNo1 and the motion vector NMV1.

When the prediction type PreType indicates a plural reference picture interpolation prediction, the switch 408 is switched to a "0" side and an interpolated block RefPol is used as a predictive image data Pred. Thus, the moving picture decoding apparatus decodes the coded moving picture data Str0 through the processing described above and outputs it as decoded image data DImg.

Meanwhile, under the moving picture coding method based on the MPEG-4, a plural reference picture interpolation prediction method called "direct mode" is defined for a picture type, called "bi-directional predictive picture", employing a plural reference picture interpolation prediction. It is defined as a method to abbreviate the motion vectors and the reference picture numbers included in the coded data of the block by calculating the motion vectors with respect to two reference pictures used for the generation of the predictive image by means of interpolation using the coded motion vectors.

FIG. 5 is an illustration for a case of using the direct mode defined in the MPEG-4. Here, a picture Pic represents a current picture to be coded, a picture Ref1 represents a reference picture whose display time is earlier than that of the current picture Pic and a picture Ref2 represents a reference picture whose display time is later than that of the current picture Pic whereas a block Blk represents a current block to be coded and a block Blk0 represents a block whose position is same as that of the current block Blk in the reference picture Ref2. A motion vector MV01 represents a forward reference motion vector using the picture Ref1 as a reference picture for coding the block Blk0, a motion vector MV1 represents a motion vector of the current block with respect to the reference picture Ref1, a motion vector MV2 represents a motion vector of the current block with respect to the reference picture Ref2, a block RefBlk1 represents a reference block to be referred to by the motion vector MV1 and a block RefBlk2 represents a reference block to be referred to by the motion vector MV2.

As for the two pictures to be used for reference by the current block Blk, the picture Ref2 whose display time is later than and is closest to the current picture is used as a backward reference picture whereas the picture Ref1, which has been used for reference by the block Blk0 at the time of coding, is used as a forward reference picture.

For the calculation of the motion vectors, it is assumed that either the motion is constant or no motions are found in comparing the pictures. Here, with an assumption that a differential value between the display time of the current picture Pic and that of the reference picture Ref1 is TRD1, a differential value between the display time of the reference picture Ref1 and that of the reference picture Ref2 is TRD2, and a differential value between the display time of the current picture Pic and that of the reference picture Ref2 is TRD3, the motion vectors MV1 and MV2 to be used for coding the current block can be calculated respectively using the following equations:

$$MV1 = MV01 \times (TRD1/TRD2) \quad \text{(Equation A)}$$

$$MV2 = -MV01 \times (TRD3/TRD2) \quad \text{(Equation B)}$$

Using the above method, the reference pictures and the motion vectors in the case of using a direct mode can be determined. The processing, in the case of using a direct mode as described above, performed by the moving picture coding apparatus, is executed by the motion estimation unit 301 shown in the block diagram illustrating the conventional moving picture coding apparatus in FIG. 1. The processing for the case of using a direct mode described above, performed by the moving picture decoding apparatus, is executed by the motion compensation unit 602 shown in the block diagram illustrating the conventional moving picture decoding apparatus in FIG. 4.

When a moving picture, in which a motion between the pictures is small, is inter-picture coded, a predictive error between the pictures become very small and most of the coded residual data ERes become "0" by performing picture coding processing such as quantization. A case in which the entire coded residual data ERes resulted from the inter-picture prediction using the reference pictures and the motion vectors of the current block is "0" in the coding in which the motion vectors and the reference pictures are determined using a predetermined method without coding them, as in the case of using a direct mode as described above, is defined as one of the prediction types PredType called "skip mode". In using a skip mode, only the prediction type PredType indicating the skip mode is transmitted, therefore, coding of a block requires a very small code amount. The efficiency of coding can be further improved by assigning variable length code that is shorter than other prediction types to this skip mode or by run-length coding the number of consecutive blocks used for the skip mode.

In the H.264 described above, "skip mode" is defined as a case in which the entire coded residual data equivalent to a single block obtained by the inter-picture prediction using a direct mode is assumed to be "0". The following processing is performed when a block is coded using a skip mode by the moving picture coding apparatus shown in FIG. 1. The motion estimation unit 301 outputs the reference picture numbers RefNo1, RefNo2, the motion vectors MV1, MV2 as well as the prediction type PredType indicating a skip mode. The variable length coding unit 302 performs variable length coding only for the prediction type PredType and outputs it as coded moving picture data Str0 through the processing explained above, when the prediction type PredType indicates a skip mode. The following processing is performed when the coded data of the block coded using a skip mode is inputted to the moving picture decoding apparatus shown in FIG. 4. The variable length decoding unit 601 performs variable length decoding on the prediction type PredType. When the prediction type PredType indicates a skip mode, the motion compensation unit 602 outputs, through the processing operated in the case of direct mode explained above, the reference picture numbers NRefNo1, NRefNo2, the motion vectors NMV1, NMV2 as well as the prediction type PredType indicating a skip mode.

In the H.264 as described above, arbitrary reference pictures can be selected out of a plurality of coded pictures regardless of the display time of the current picture. However, the arbitrary reference pictures are selected by performing motion estimation for the plurality of the coded pictures in this case, therefore, the processing burden caused by the motion estimation becomes very large. The plural reference picture interpolation prediction also contains a problem of degrading the coding efficiency since it requires coding of reference picture numbers and motion vectors for every two reference pictures.

Furthermore, when inter-picture prediction is performed for a picture using a picture whose display time is later than that of the current picture as a reference picture, as in the case of bi-directional prediction described in the conventional technique, the picture has to be coded in an order different from a display order, which causes a delay. In a case of real time communication such as a videophone, bi-directional predictive pictures cannot be used because of the delay. In the H.264, however, two arbitrary reference pictures can be selected regardless of display order information, therefore, the delay caused by coding can be eliminated by performing a plural reference picture interpolation prediction with a selection of two pictures respectively having a display time which is earlier than that of the current picture. However, the picture whose display time is later than that of the current picture is not stored in the multi-picture buffer, therefore, the direct mode conventionally used for determining the motion vectors using the picture whose display time is later than that of the current picture as described above cannot be employed.

DISCLOSURE OF INVENTION

The present invention is conceived in view of above circumstances, and aims to provide a moving picture coding method and a moving picture decoding method for realizing an effective coding as well as a reduction of the processing burden when a plural reference picture interpolation prediction is performed.

In order to achieve the above objects, the moving picture coding method according to the present invention codes each picture composing an input moving picture on a block-by-block basis and comprises: a common reference picture determination step of determining a picture shared for reference among a plurality of blocks on which coding is performed with reference to a coded picture; a predictive image generation step of generating a predictive image using the common reference picture; and a coding step of coding a current block to be coded using the predictive image.

Thus, when the predictive image is generated using a reference picture, the processing burden can be reduced since the processing for selecting on a block-by-block basis a picture to be used as a reference picture from among a plurality of coded pictures is not required. The coding of this reference picture on a block-by-block basis is not necessary. Therefore, the bit amount can be reduced. In general, it is highly possible that most of the blocks in the image data select the same picture as an optimal reference picture. Therefore, it is possible to reduce the processing burden while maintaining a high coding efficiency by sharing a reference picture on a picture-by-picture basis, for instance.

Also, the moving picture coding method according to the present invention codes each picture composing an input moving picture on a block-by-block basis and comprises: a common reference picture determination step of determining a first picture to be shared for reference picture among a plurality of blocks on which coding is performed with reference to two coded pictures; a predictive image generation step of generating a predictive image with reference to the first picture and a second picture selected on a block-by-block basis from among coded pictures; and a coding step of coding a current block to be coded using the predictive image.

Thus, when the predictive picture is generated with reference to two reference pictures, the processing burden can be reduced since the processing for selecting a single picture on a block-by-block basis as the one reference picture from among a plurality of coded pictures is not necessary. The bit amount can be also reduced since the coding of this reference picture on a block-by-block basis is not necessary. Generally speaking, it is highly possible that most of the blocks in the image data select the same picture as an optimal reference picture. Therefore, it is possible to reduce the processing burden while maintaining a high coding efficiency by sharing one of the reference pictures on a picture-by-picture basis, for instance.

Here, the moving picture coding method may further comprise an information description step of describing information for specifying the common reference picture in a common information area assigned for the plurality of blocks in coded moving picture data to be generated.

Thus, the information for specifying the common reference picture can be described in the coded moving picture data and then outputted; therefore, the reference picture can be certainly specified when the coded moving picture data is decoded.

The moving picture decoding method according to the present invention decodes coded moving picture data obtained by coding each picture on a block-by-block basis and comprises: a common reference picture determination step of determining a picture shared for reference among a plurality of blocks on which decoding is performed with reference to a decoded picture; a predictive image generation step of generating a predictive image using the common reference picture; and a decoding step of decoding a current block to be decoded using the predictive image.

Thus, the coded moving picture data, which is coded with reference to a common reference picture and then outputted, can be decoded properly in the decoding processing.

Also, the moving picture decoding method according to the present invention decodes coded moving picture data obtained by coding each picture on a block-by-block basis and comprises: a common reference picture determination step of generating a predictive image with reference to the first picture and a second picture selected on a block-by-block basis from among decoded pictures; and a decoding step of decoding a current block to be decoded using the predictive image.

Thus, the moving picture data, which is coded with reference to a common reference picture and a reference picture used on a block-by-block basis, can be decoded properly in the decoding processing.

Here, the moving picture decoding method may further comprise an information extraction step of extracting information for specifying the common reference picture in a common information area assigned for the plurality of blocks in the coded moving picture data.

Thus, the information for specifying the common reference picture can be extracted from the coded moving picture, and thereby, the reference picture can surely be specified.

The present invention can be realized not only as the moving picture coding method and the moving picture decoding method as described above, but also as a moving picture coding apparatus and a moving picture decoding apparatus having characteristic steps included in the moving picture coding method and the moving picture decoding method as units. It can be also realized as a program having a computer execute these steps or as coded moving picture data that is coded with the use of the moving picture coding method. Needless to say, such program and coded moving picture data can be distributed via a recording medium such as a CD-ROM and a transmission medium such as an Internet.

BRIEF DESCRIPTION OF DRAWINGS

FIG. 19A is an illustration showing an example of a physical format of a flexible disk which is a main body of a storing medium. FIG. 19B is an illustration showing a full appearance of the flexible disk, a structure at cross section and the flexible disk itself. FIG. 19C is an illustration showing a configuration for recording and reproducing the program on the flexible disk FD.

BEST MODE FOR CARRYING OUT THE INVENTION

First Embodiment

Figure 1:
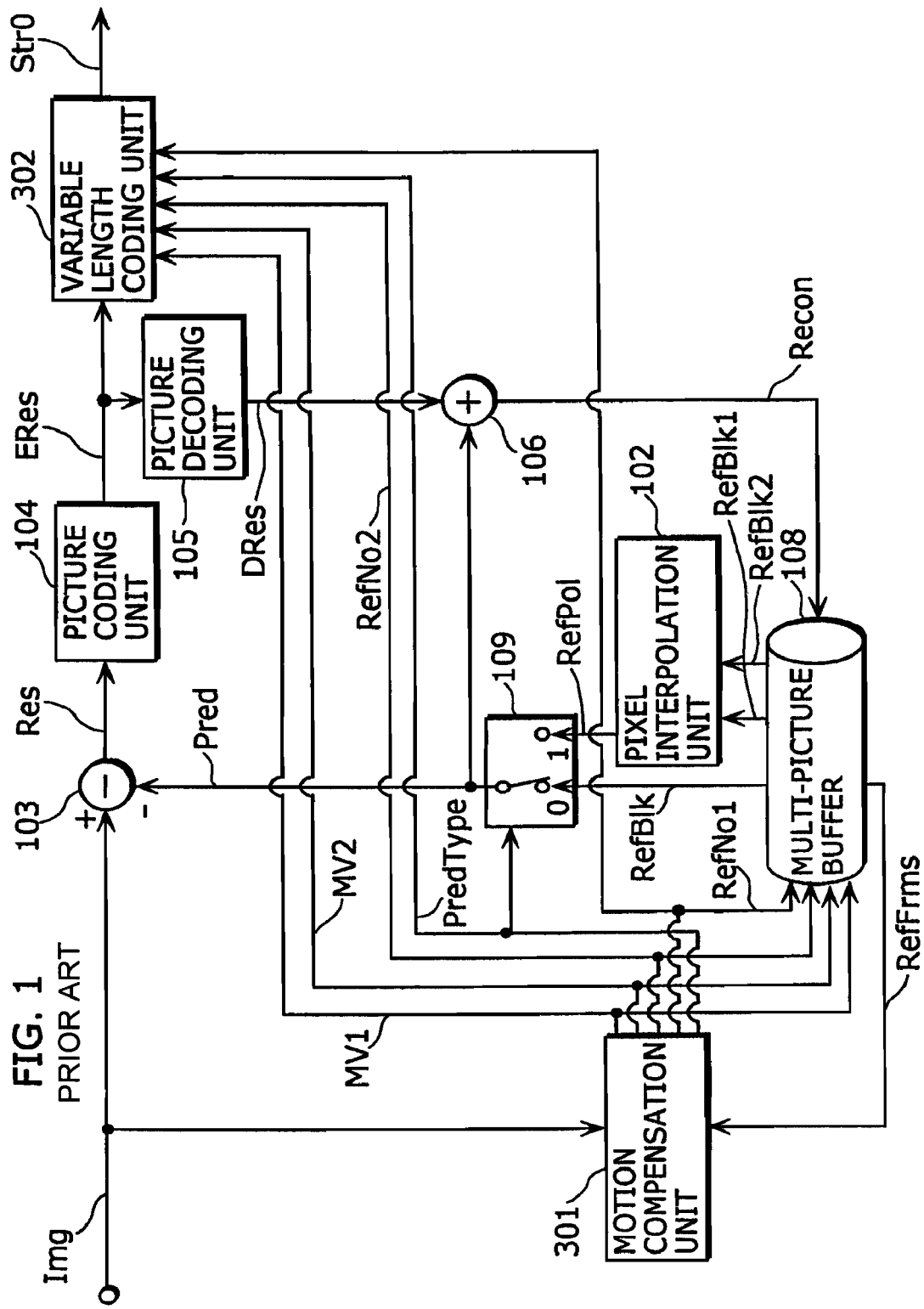
FIG. 1 is a block diagram showing a structure of a conventional moving picture coding apparatus.
Figure 2:
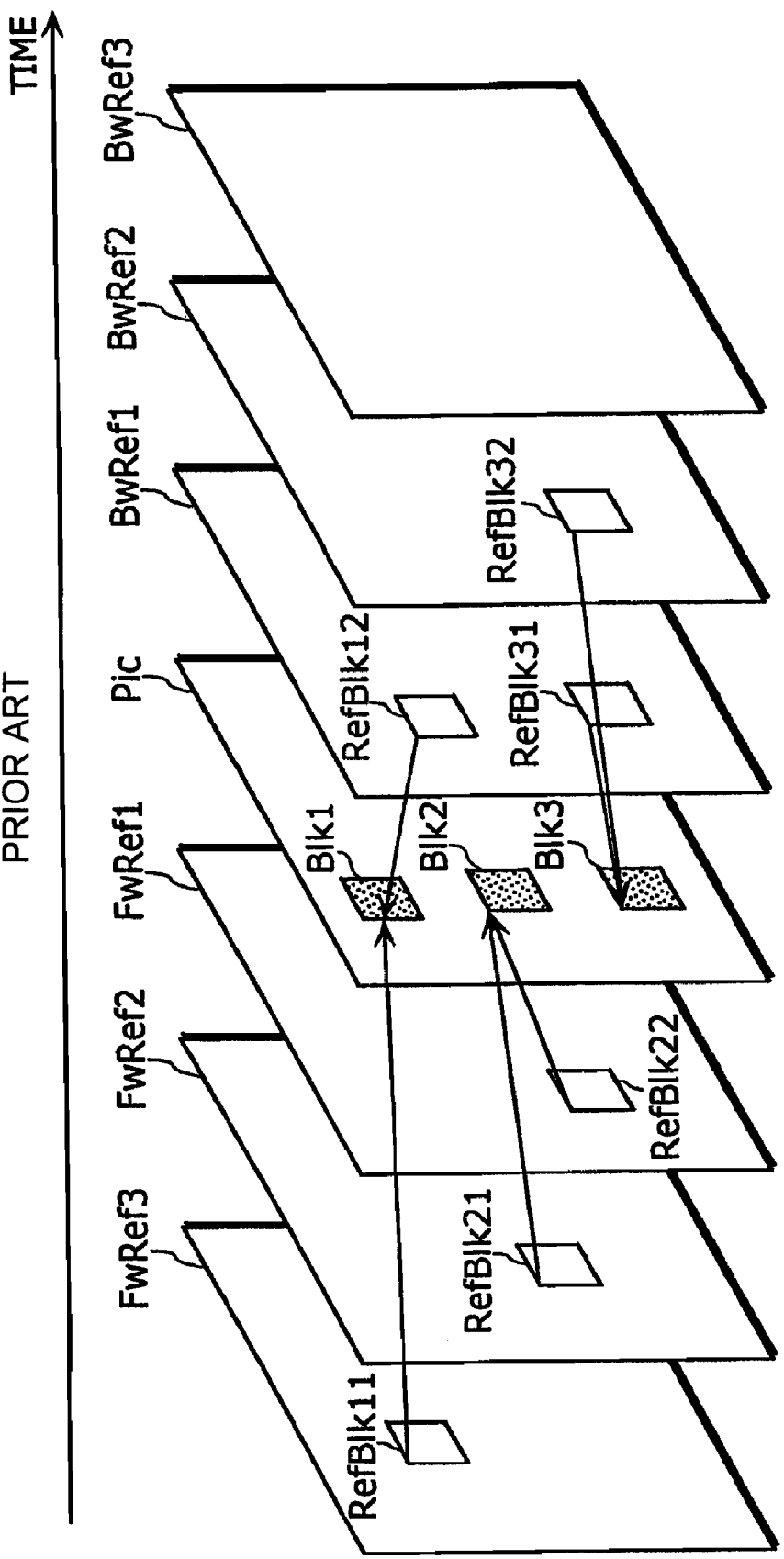
FIG. 2 is a conceptual diagram showing an interpolation prediction using a plurality of reference pictures.
Figure 6:
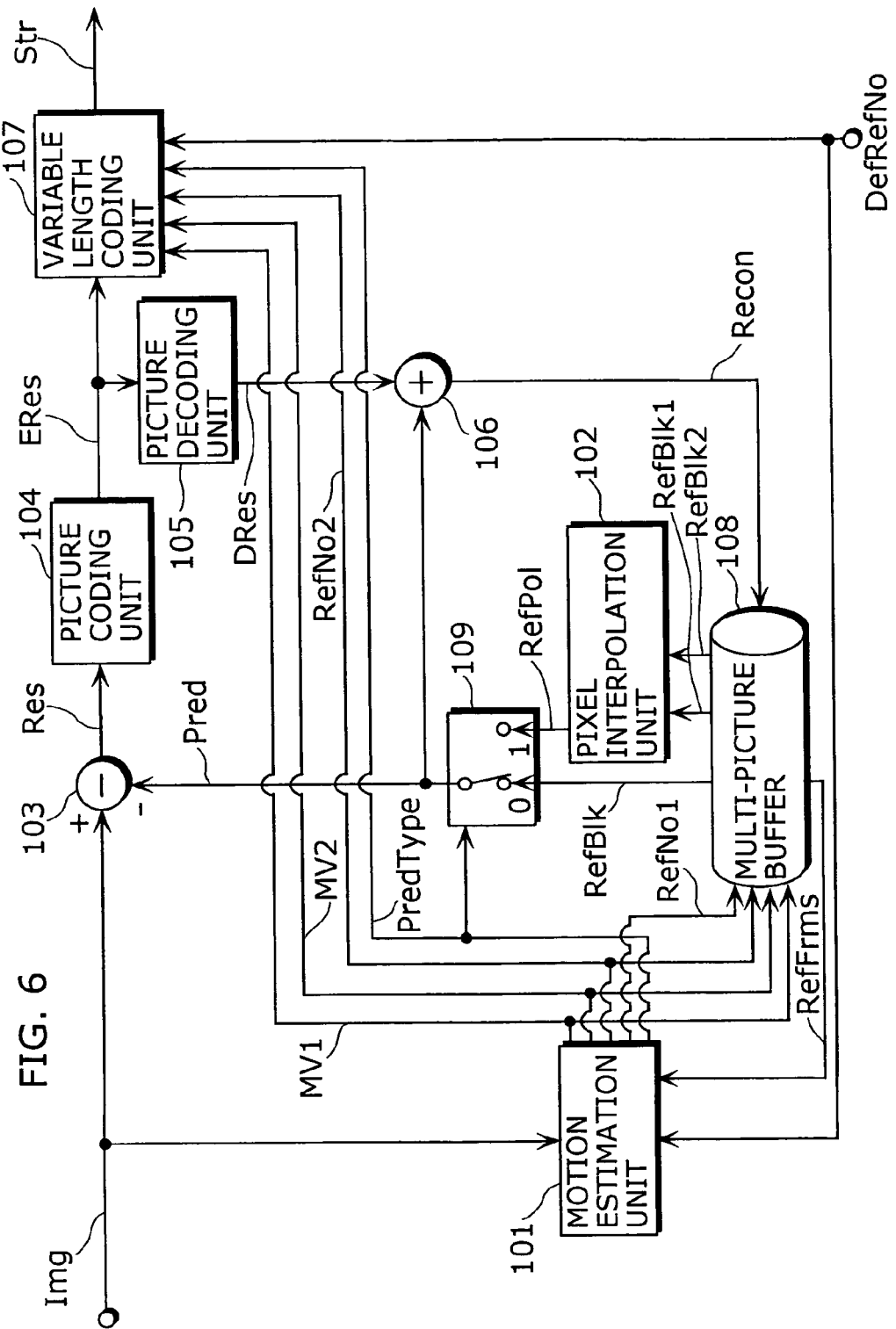
FIG. 6 is a block diagram showing a structure of a moving picture coding apparatus according to a first embodiment.

FIG. 6 is a block diagram showing a structure of a moving picture coding apparatus according to the first embodiment. The same marks are used for the units and the data operating in the same mariner as described in the block diagram showing a structure of a conventional moving picture coding apparatus in FIG. 1 and the description will be abbreviated. It is possible for the moving picture coding apparatus and the moving picture decoding apparatus according to each embodiment described below to switch, on a block-by-block basis, between the following prediction methods: a method of generating a predictive image by pixel interpolation using two reference pictures (a plural reference picture interpolation prediction); a method of using a block included in a single arbitrary picture directly as a predictive image; a method of generating a predictive image using an intra-picture prediction.

The moving picture coding apparatus is an apparatus for dividing an inputted picture data Img into blocks and performing coding on each of the blocks, and includes a motion estimation unit 101, the pixel interpolation unit 102, the subtractor 103, the picture coding unit 104, the picture decoding unit 105, the adder 106, a variable length coding unit 107, the multi-picture buffer 108 and the switch 109.

A default reference picture number DefRefNo indicating that one of the reference pictures is to be used for a block that is coded using a plural reference picture interpolation prediction is inputted to the moving picture coding apparatus. The motion estimation unit 101 performs motion estimation by fixing one of two reference pictures as the reference picture indicated by the inputted default reference picture number DefRefNo, when a plural reference picture interpolation prediction is performed. The reference picture number RefNo1 outputted by the motion estimation unit 101 therefore indicates the same value as indicated by the default reference picture number DefRefNo. The variable length coding unit 107 performs variable length coding for the coded residual data ERes, the prediction type PredType, the reference picture number RefNo2, the motion vectors MV1, MV2, and the default reference picture number DefRefNo, and outputs them as coded moving picture data Str.

The following describes an operation performed by the moving picture coding apparatus constructed as above, when the prediction type of the current block is a plural reference picture interpolation prediction.

The inputted image data Img is inputted to the motion estimation unit 101 and the subtractor 103 on a block-by-block basis.

The motion estimation unit 101 determines a prediction type of the inputted current block and outputs the prediction type to the switch 109 and the variable length coding unit 107. When the determined prediction type PredType is a plural reference picture interpolation prediction, the motion estimation unit 101 determines the one of the two reference pictures as the reference picture indicated by the inputted default reference picture number DefRefNo and determines respectively the other reference picture and motion vectors MV1 and MV2 with respect to these two reference pictures. The motion estimation unit 101 then outputs a reference picture number RefNo2 and the motion vectors MV1 and MV2 to the multi-picture buffer 108 and the variable length coding unit 107 as well as the reference picture number RefNo1 to the multi-picture buffer 108. The default reference picture number DefRefNo may be outputted from the motion estimation 101 to the variable length coding unit 107.

Next, the multi-picture buffer 108 outputs a reference block RefBlk1 corresponding to the reference picture number RefNo1 and the motion vector MV1 as well as a reference block RefBlk2 corresponding to the reference picture number RefNo2 and the motion vector MV2 to the pixel interpolation unit 102. The pixel interpolation 102 interpolates pixels with respect to the two reference blocks RefBlk1 and RefBlk2 with the use of an average value and outputs it as an interpolated block RefPol. Here, the prediction type determined by the motion estimation unit 101 is a plural reference picture interpolation prediction, the switch 109 is switched to a "1" side and the interpolated block RefPol is outputted as predictive image data Pred to the subtractor 103 and the adder 106.

The subtractor 103 subtracts the predictive image data Pred from the inputted image data Img and outputs it as residual data Res to the picture coding unit 104. The picture coding unit 104 performs picture coding processing such as orthogonal transformation and quantization on the inputted residual data Res and outputs it as coded residual data ERes to the picture decoding unit 105 and the variable length coding unit 107. The picture decoding unit 105 performs picture decoding processing such as inverse quantization and inverse orthogonal transformation on the inputted coded residual data ERes and outputs it as decoded residual data DRes to the adder 106. The adder 106 adds the decoded residual data DRes to the predictive image data Pred and outputs it as reconstructed image data Recon. The data having the possibility to be used for reference in the subsequent inter-picture prediction out of the reconstructed data Recon is stored in the multi-picture buffer 108.

The variable length coding unit 107 performs variable length coding for the inputted coded residual data ERes, the prediction type PredType, the reference picture number RefNo2 and the motion vectors MV1, MV2 for each block and outputs them as coded moving picture data Str.

For the picture indicated by the default reference picture number DefRefNo, an arbitrary picture can be selected from the pictures stored in the multi-picture buffer 108. For example, a coded picture having display order information which is the closest to that of the current picture, a coded picture having display order information which is prior to and the closest to that of the current picture, a coded picture having display order information which is subsequent to and the closest to that of the current picture, and the like, in the multi-picture buffer 108, are conceivable.

Similarly, a picture that is the closest to the current picture in a coding order, a picture having display order information which is prior to that of the current picture and a coding order which is the closest to that of the current picture, a picture having display order information which is prior to that of the current picture and a coding order which is the closest to that of the current picture, a picture having display order information which is subsequent to that of the current picture and a coding order which is the closest to that of the current picture, and the like, are also conceivable.

Figure 3:
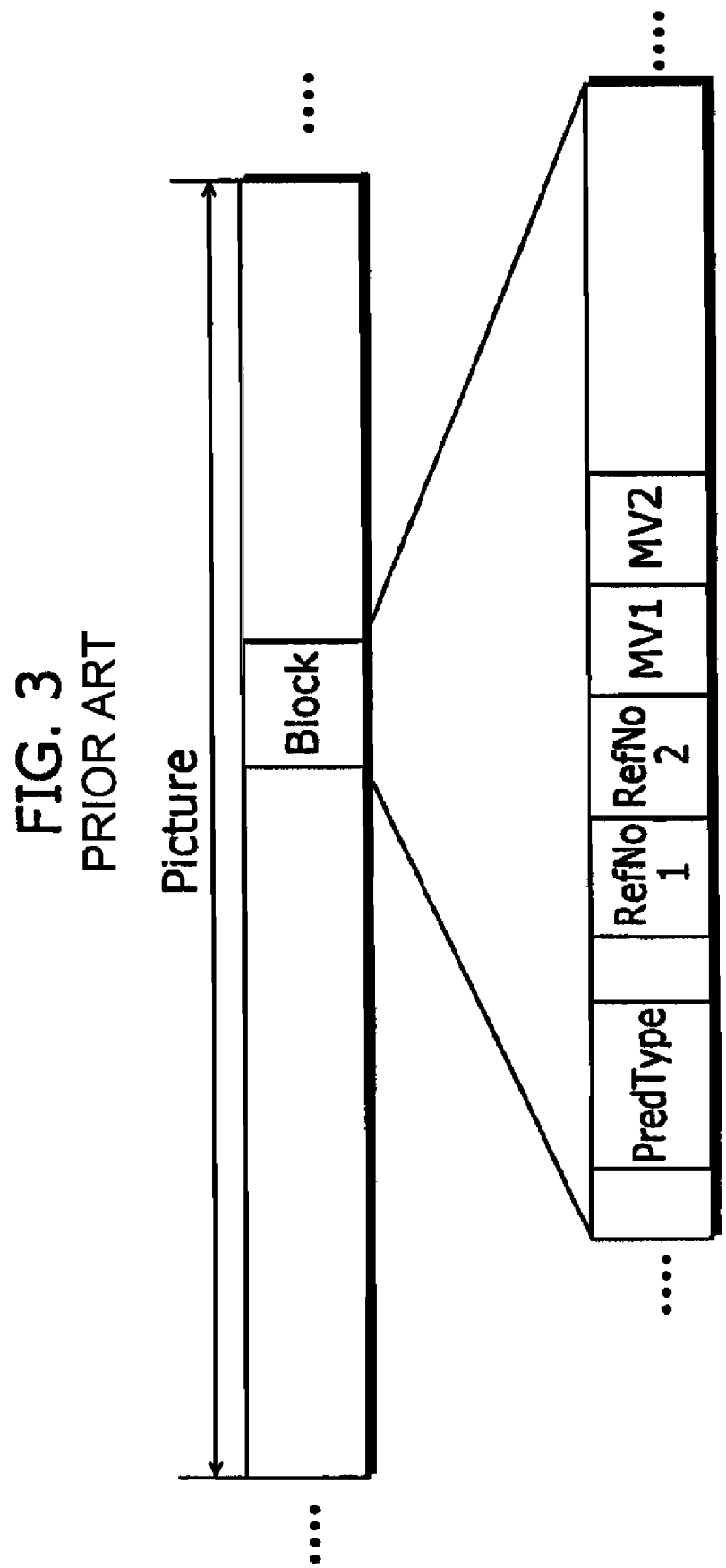
FIG. 3 is a conceptual diagram showing a data format of a coded moving picture employed by the conventional moving picture coding apparatus.
Figure 7:
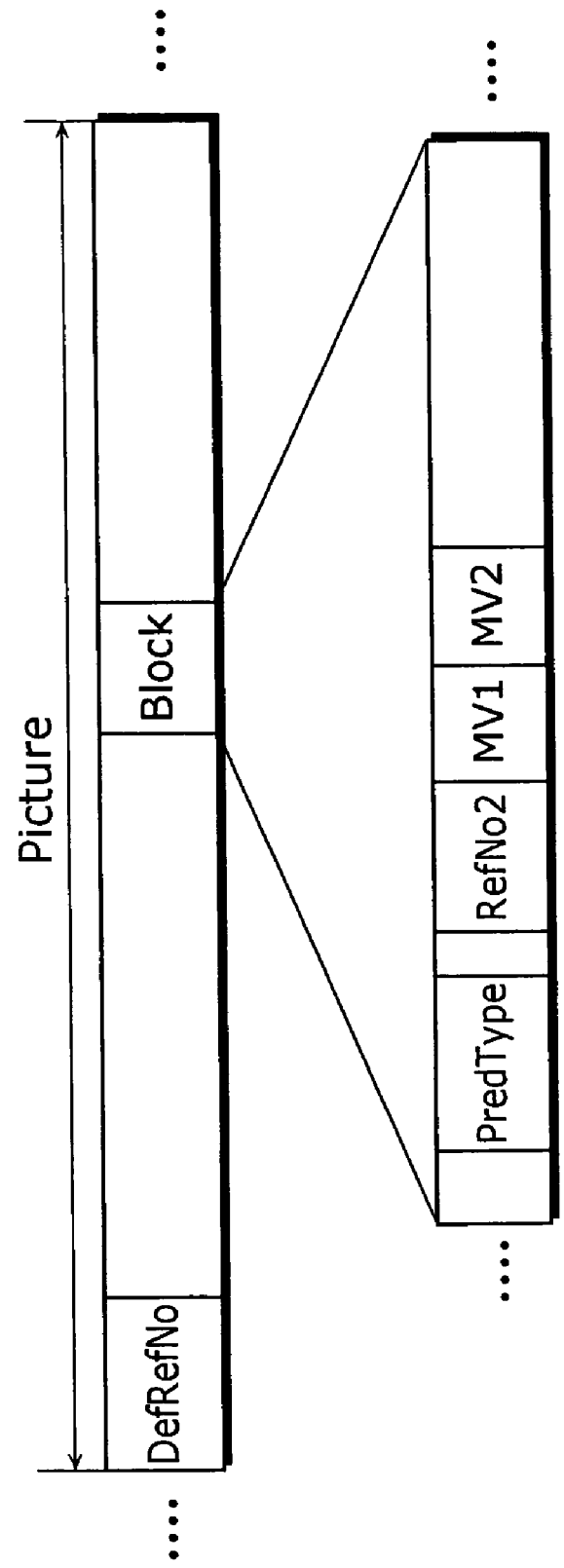
FIG. 7 is a conceptual diagram showing a data format of a coded moving picture according to the first embodiment.

FIG. 7 is a conceptual diagram showing a data format of a coded moving picture according to the first embodiment. The same marks are put for the same data as described in the conceptual diagram showing the data format of the coded moving picture employed by the conventional moving picture coding apparatus shown in FIG. 3, and the description will be abbreviated. The difference between the data format of the coded moving picture according to the present embodiment and the one employed by the conventional moving picture coding apparatus is that a default reference picture number DefRefNo is included for each picture and that only a single data for the reference picture number is included in the coded data of the block that is coded using a plural reference picture interpolation prediction.

According to the present embodiment as described above, the coding efficiency can be improved since the fixed reference picture number does not need to be coded on a block-by-block basis. This is because an arbitrary picture is selected for the one reference picture on a block-by-block basis from among plural coded pictures, and the other reference picture can be fixed as a picture among plural coded pictures on a picture-by-picture basis.

In the present embodiment, as a method of specifying a default reference picture, the picture numbers are assigned to the pictures, however, the present invention shall not be limited to this. For example, it is possible to specify a default reference picture either using a relative differential value between the picture number possessed by the current picture and the picture number possessed by the picture selected as a default reference picture or using information such as a command indicating a default reference picture.

In the present embodiment, only one reference picture is specified as a default reference picture, however, both of the two reference picture numbers in the coded data of the block can be abbreviated by coding two default reference picture numbers.

Also, in the present embodiment, the description is provided for the plural reference picture interpolation predictions for generating a predictive image by pixel interpolation using two reference pictures. However, a case of single reference picture interpolation prediction using a block included in an arbitrary single picture as a predictive image can be handled in the same manner. In this case, there is no need to describe the reference picture information for each block, and therefore, the reference picture information is described only in a common information area.

The default reference picture numbers are coded on a picture-by-picture basis in the present embodiment, however, they may be coded using a syntax structure which stores a single default reference picture number for every plural picture or they may be coded using a syntax structure which stores a single default reference picture number for a syntax structure lower than a picture such as a macroblock which is composed of plural blocks or a slice which is made up of plural macroblocks, or the like.

Second Embodiment

Figure 4:
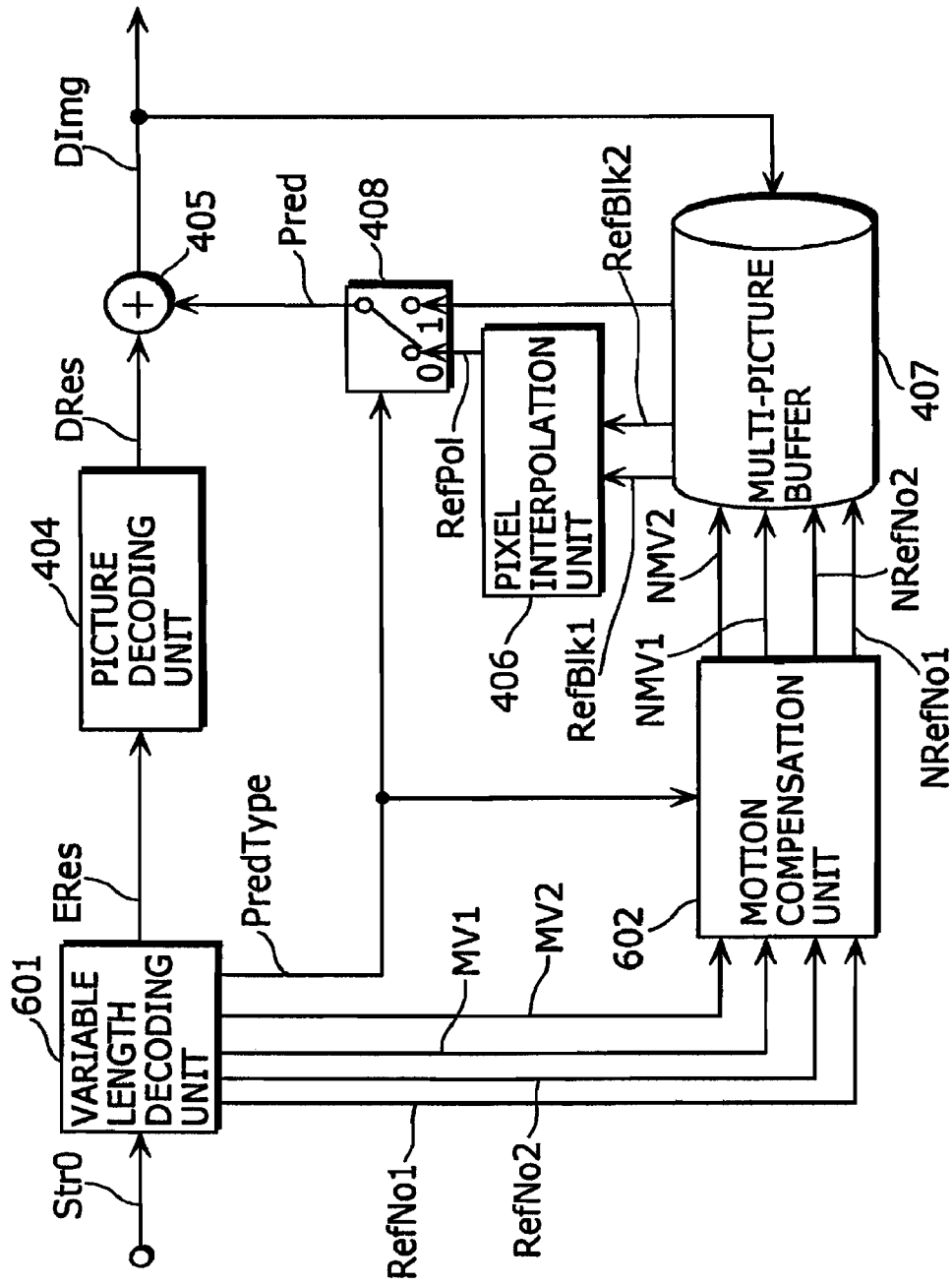
FIG. 4 is a block diagram showing a structure of a conventional moving picture decoding apparatus.
Figure 5:
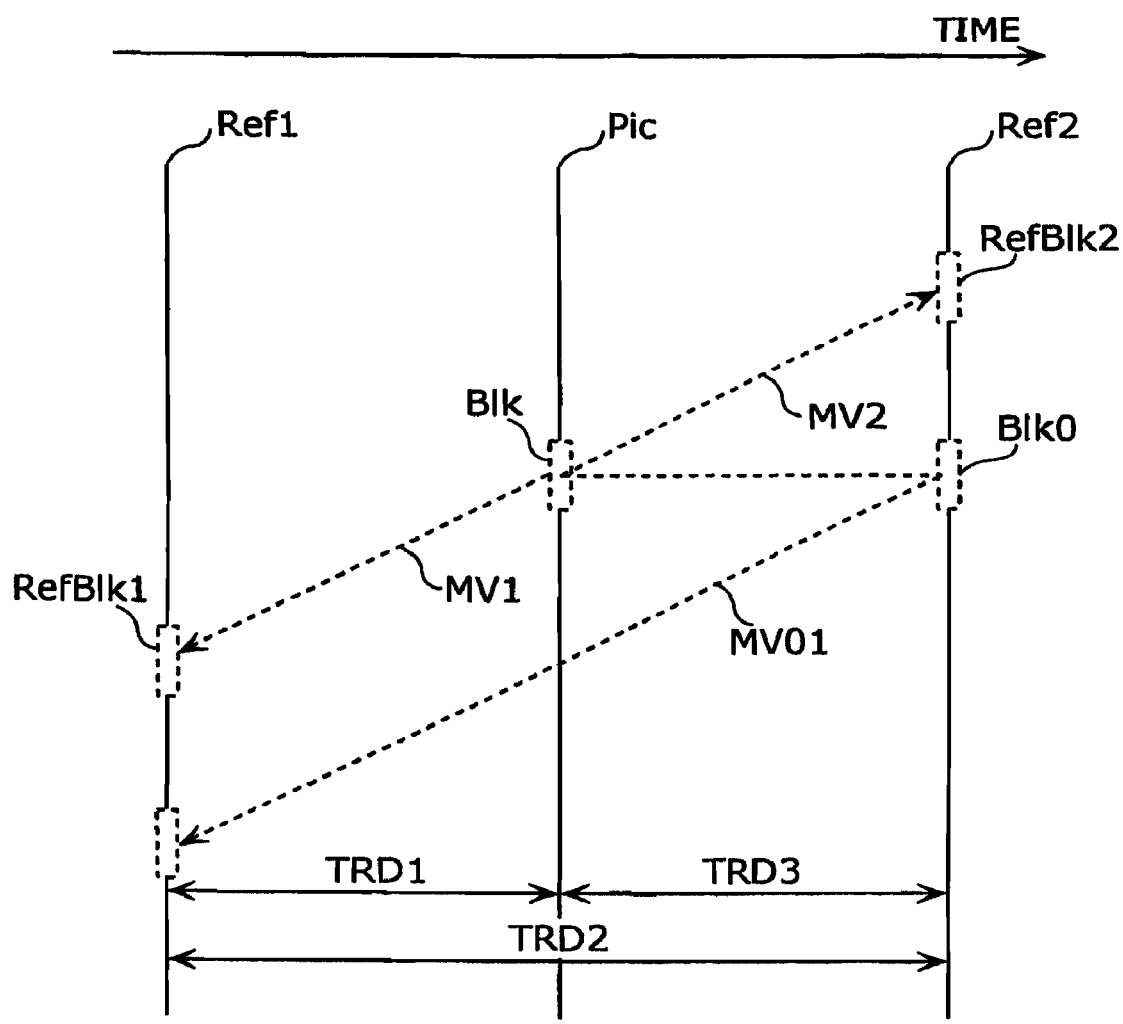
FIG. 5 is an illustration for a conventional direct mode.
Figure 8:
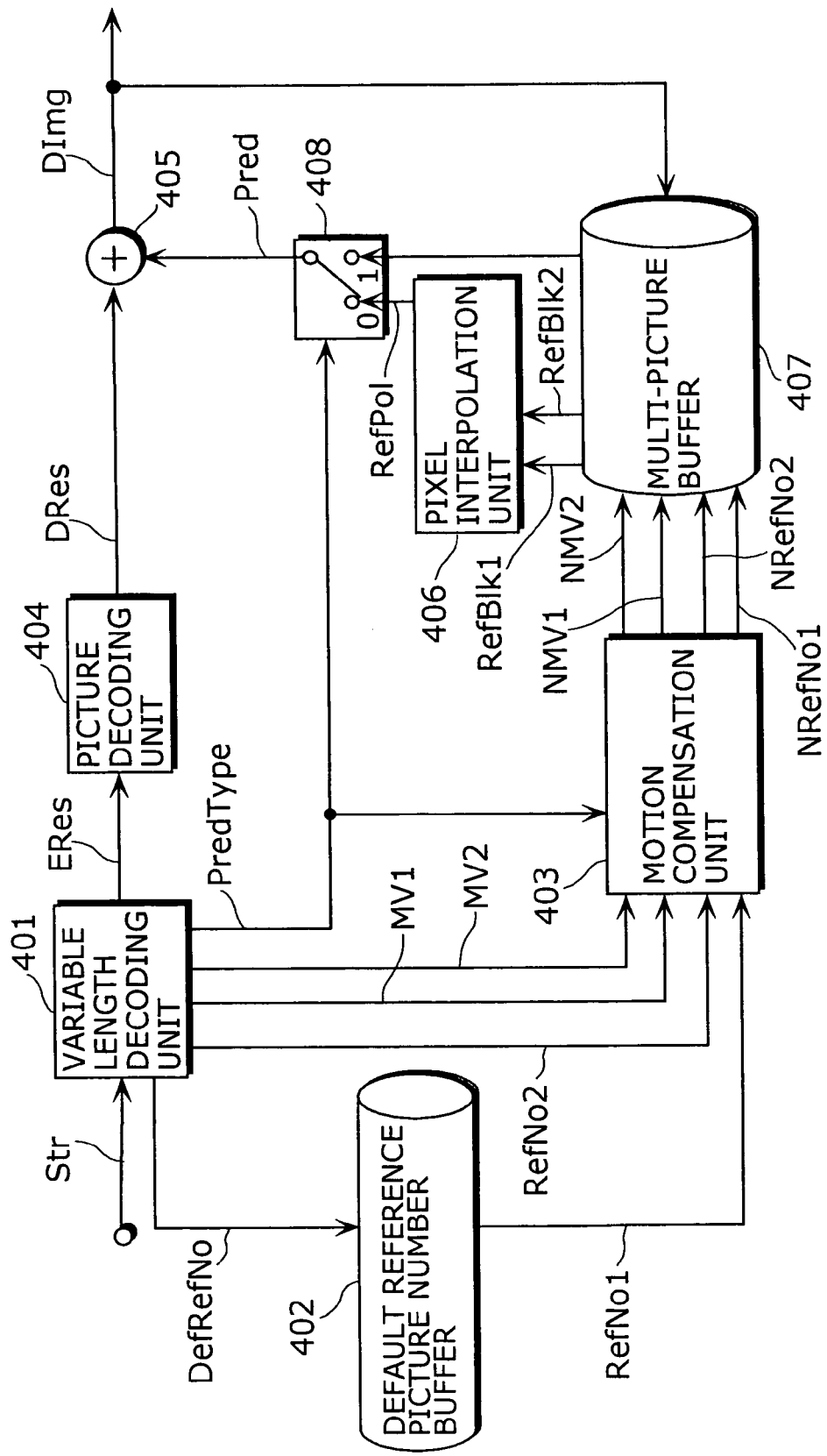
FIG. 8 is a block diagram showing a structure of a moving picture decoding apparatus according to a second embodiment.

FIG. 8 is a block diagram showing a moving picture decoding apparatus according to the second embodiment of the present invention. The same marks are used for the units and the data operating in the same manner as illustrated in the block diagram showing a structure of the conventional moving picture decoding apparatus in FIG. 4, and the description will be abbreviated. The difference between the moving picture decoding apparatus of the present embodiment and the conventional one shown in FIG. 4 is that a default reference picture number buffer 402 is added to the former.

The moving picture decoding apparatus, as shown in FIG. 8, includes a variable length decoding unit 401, a default reference picture number buffer 402, a motion compensation unit 403, a picture decoding unit 404, an adder 405, a pixel interpolation unit 406, a multi-picture buffer 407 and a switch 408.

The variable length decoding unit 401 performs variable length decoding on the inputted coded moving picture data Str and outputs coded residual data ERes, a prediction type PredType, a reference picture number RefNo2, motion vectors MV1 and MV2, a default reference picture number DefRefNo. The decoded default reference picture number DefRefNo needs to be shared among plural blocks so that it is stored in the default reference picture number buffer 402. The default reference picture number DefRefNo stored in the default reference picture number buffer 402 is inputted as a reference picture number RefNo1 in the motion compensation unit 403.

The following describes an operation of the moving picture decoding apparatus constructed as above when a prediction type of a current block to be decoded is a plural reference picture interpolation prediction.

The coded moving picture data Str is inputted to the variable length decoding unit 401. The variable length decoding unit 401 performs variable length decoding on the inputted coded moving picture data Str and outputs respectively, as follows: the coded residual data ERes to the picture decoding unit 404; the reference picture number RefNo2 and the motion vectors MV1, MV2 to the motion compensation unit 403; the prediction type PredType to the motion compensation unit 403 and the switch 408; and the default reference picture number DefRefNo to the default reference picture number buffer 402. The default reference picture number buffer 402 outputs the stored default reference picture number DefRefNo as a reference picture number RefNo1 to the motion compensation unit 403.

Since the prediction type PredType is a plural reference picture interpolation prediction, the motion compensation unit 403 outputs, to the multi-picture buffer 407, the reference picture number NRefNo1 inputted by the default reference picture number buffer 402 and the reference picture number RefNo2 and the motion vectors MV1, MV2 inputted by the variable length decoding unit 401 and instructs an output of the reference blocks. The multi-picture buffer 407 outputs, to the pixel interpolation unit 406, the reference block RefBlk1 corresponding to the reference picture number NRefNo1 and the motion vector NMV1 and the reference block RefBlk2 corresponding to the reference picture number NRefNo2 and the motion vector NMV2. The pixel interpolation unit 406 interpolates the pixel values with respect to the two reference blocks RefBlk1 and RefBlk2 using an average value and outputs it as an interpolated block RefPol. Here, since the prediction type is a plural reference picture interpolation prediction, the switch 408 is switched to a "0" side and the interpolated block RefPol is thereby outputted as a predictive image data Pred to the adder 405.

On the other hand, the picture decoding unit 404 to which the coded residual data ERes is inputted performs picture decoding processing such as inverse quantization and inverse orthogonal transformation and outputs decoded residual data DRes to the adder 405. The adder 405 adds the decoded residual data DRes to the predictive image data Pred and outputs it as decoded image data DImg outside the moving picture decoding apparatus. The multi-picture buffer 407 stores the decoded image data DImg for inter-picture prediction. The moving picture decoding apparatus decodes the coded moving picture data Str through such processing and outputs it as the decoded image data DImg.

According to the present embodiment as described above, it is possible to decode properly the coded moving picture data Str which is coded by the moving picture coding apparatus using the moving picture coding method of the present invention described in the first embodiment.

Third Embodiment

Figure 9:
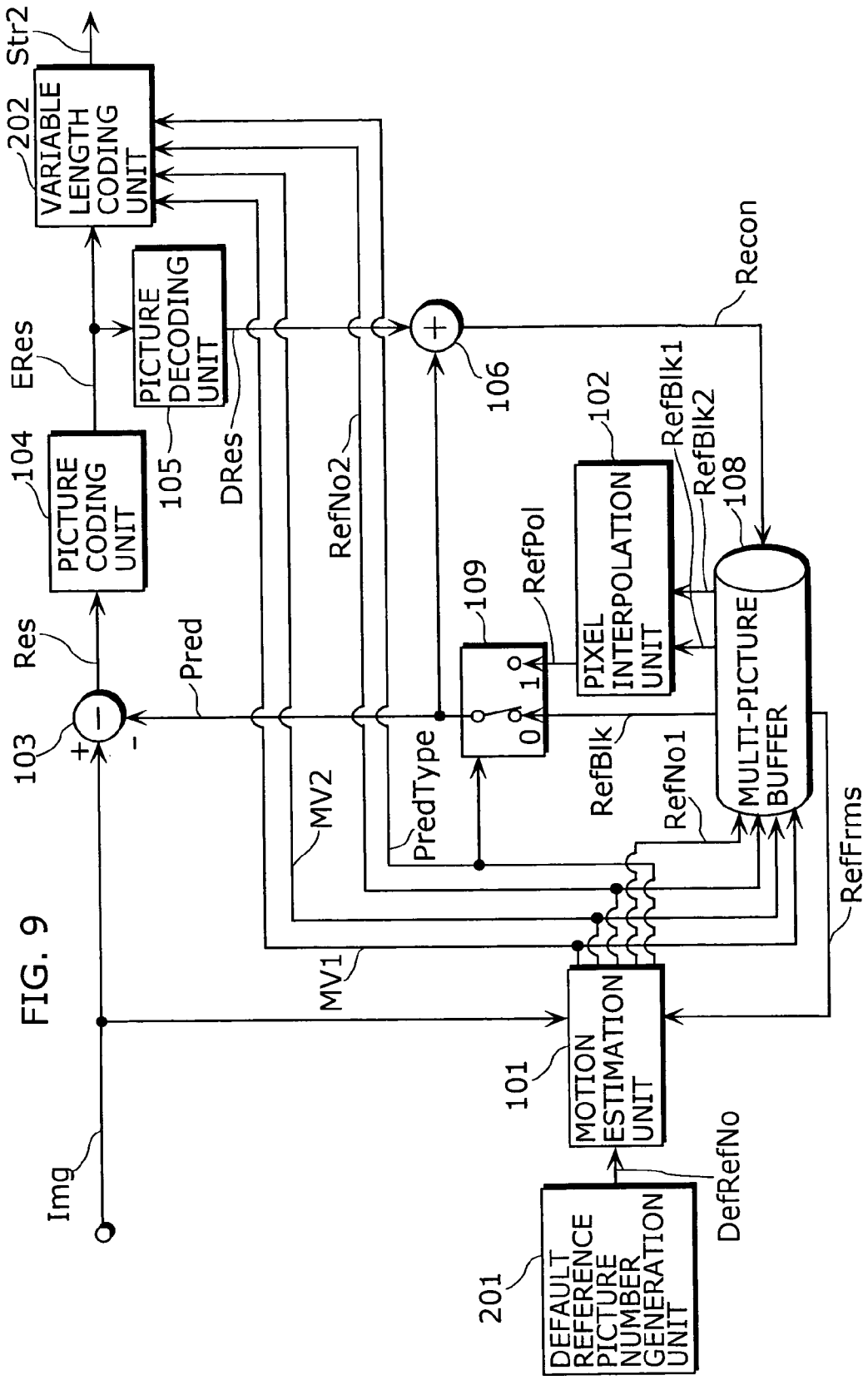
FIG. 9 is a block diagram showing a structure of a moving picture coding apparatus according to a third embodiment.

FIG. 9 is a block diagram showing a moving picture coding apparatus according to the third embodiment of the present invention. The same marks are used for the units and the data operating in the same manner as shown in the block diagram illustrating the moving picture coding apparatus according to the first embodiment in FIG. 6, and the description will be abbreviated.

The moving picture coding apparatus of the present embodiment includes a default reference picture number generation unit 201 in addition to the structure shown in the first embodiment. The default reference picture number generation unit 201 generates a default reference picture number DefRefNo using a predetermined method and outputs it to the motion estimation unit 101. The motion estimation unit 101 performs motion estimation, by fixing the one of two reference pictures as the reference picture indicated by the inputted default reference picture number DefRefNo, when the plural reference picture interpolation prediction is performed as in the case of the moving picture coding apparatus according to the first embodiment. The variable length coding unit 202 performs variable length coding on the coded residual data ERes, the prediction type PredType, the reference picture number RefNo2 and the motion vectors MV1, MV2 and outputs them as coded moving picture data Str2.

For example, the following methods are available as a method of generating a default reference picture number DefRefNo employed by the default reference picture number generation unit 201. The first method is to determine, as a default reference picture number DefRefNo, a picture number indicating a picture having display order information which is the closest to that of the current picture out of the coded pictures stored in the multi-picture buffer 108. The second method is to determine, as a default reference picture number DefRefNo, a picture number indicating a picture having display order information which is prior to and the closest to that of the current picture out of the coded pictures stored in the multi-frame buffer 108. The third method is to determine, as a default reference picture number DefRefNo, a picture number indicating a picture having display order information which is subsequent to and is the closest to that of the current picture out of the coded pictures stored in the multi-picture buffer 108. The fourth method is to determine, as a default reference picture number DefRefNo, a picture number indicating a picture whose coding order is the closest to that of the current picture out of the coded pictures stored in the multi-picture buffer 108. The fifth method is to determine, as a default reference picture number DefRefNo, a picture number indicating a picture which has display order information prior to that of the current picture and whose coding order is the closest to that of the current picture out of the coded pictures stored in the multi-picture buffer 108. The sixth method is to determine, as a default reference picture number DefRefNo, a picture number indicating a picture which has display order information subsequent to that of the current picture and whose coding order is the closest to that of the current picture out of the coded pictures stored in the multi-picture buffer 108.

Figure 10:
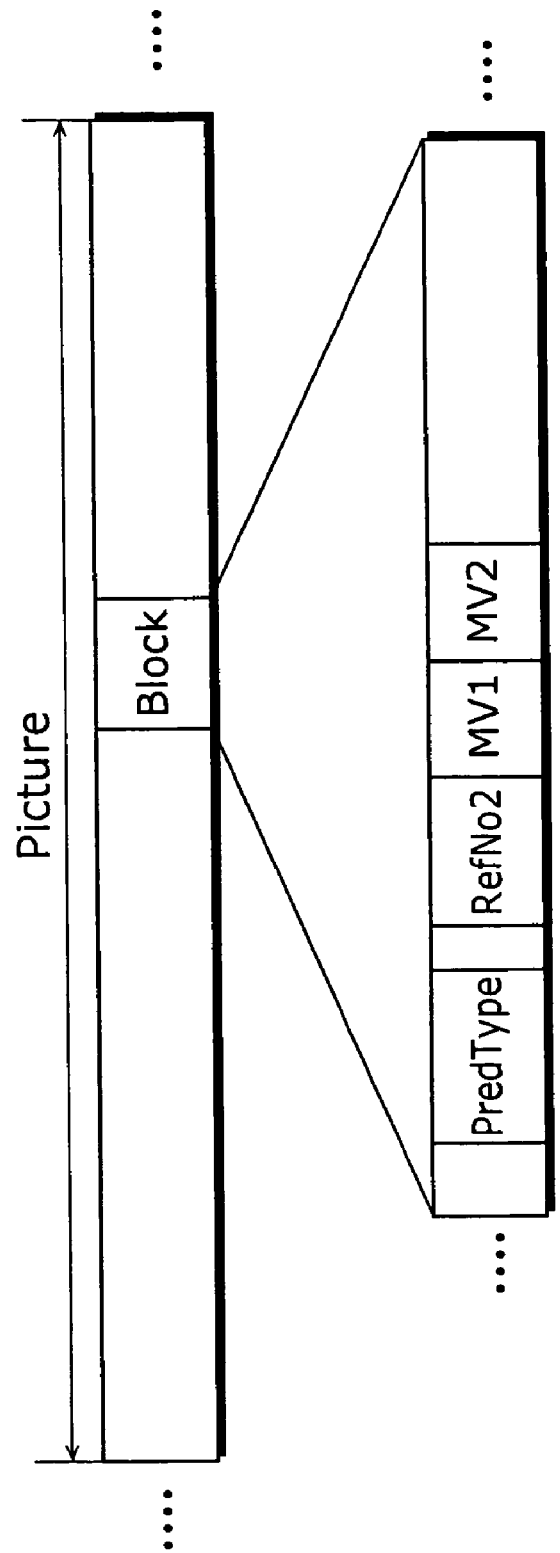
FIG. 10 is a conceptual diagram showing a data format of a coded moving picture according to the third embodiment.

The data format of the coded moving picture used by the moving picture coding apparatus according to the present embodiment is as shown in FIG. 10, from which the default reference picture number DefRefNo shown in the data format of the coded moving picture shown in FIG. 7 is omitted. Therefore, a default reference picture number DefRefNo does not need to be coded, which improves the coding efficiency.

In the above-mentioned embodiment, a method of realizing the coding without describing information on the default reference picture at all on a data format by fixing a method to any arbitrary one for determining a default reference picture is explained. It is, however, possible to switch between the methods to determine a default reference picture on a picture-by-picture basis. For example, this can be realized by coding either of the following identifiers: an identifier indicating a method of selecting, as a default reference picture, a picture having display time information which is the closest to that of the current picture out of the coded pictures stored in the multi-picture buffer; an identifier indicating a method of selecting, as a default reference picture, a picture having display time information which is prior to and is the closest to that of the current picture out of the coded pictures stored in the multi-picture buffer; and an identifier indicating a method of selecting, as a default reference picture, a picture having information on a display time which is subsequent to and is the closest to that of the current picture out of the coded pictures stored in the multi-picture buffer.

Figure 11:
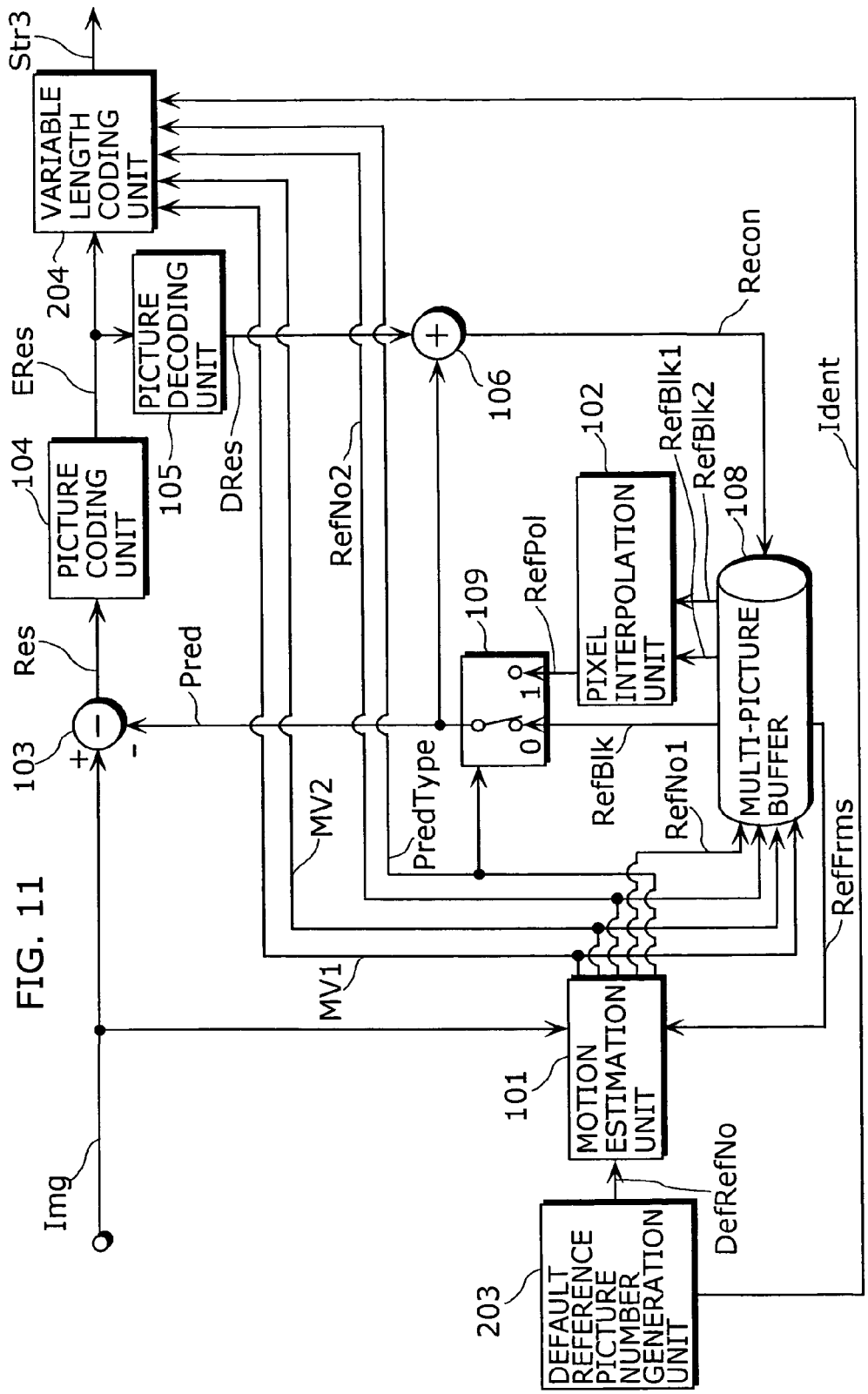
FIG. 11 is a block diagram showing a structure of a variation of the moving picture coding apparatus according to the third embodiment.
Figure 12:
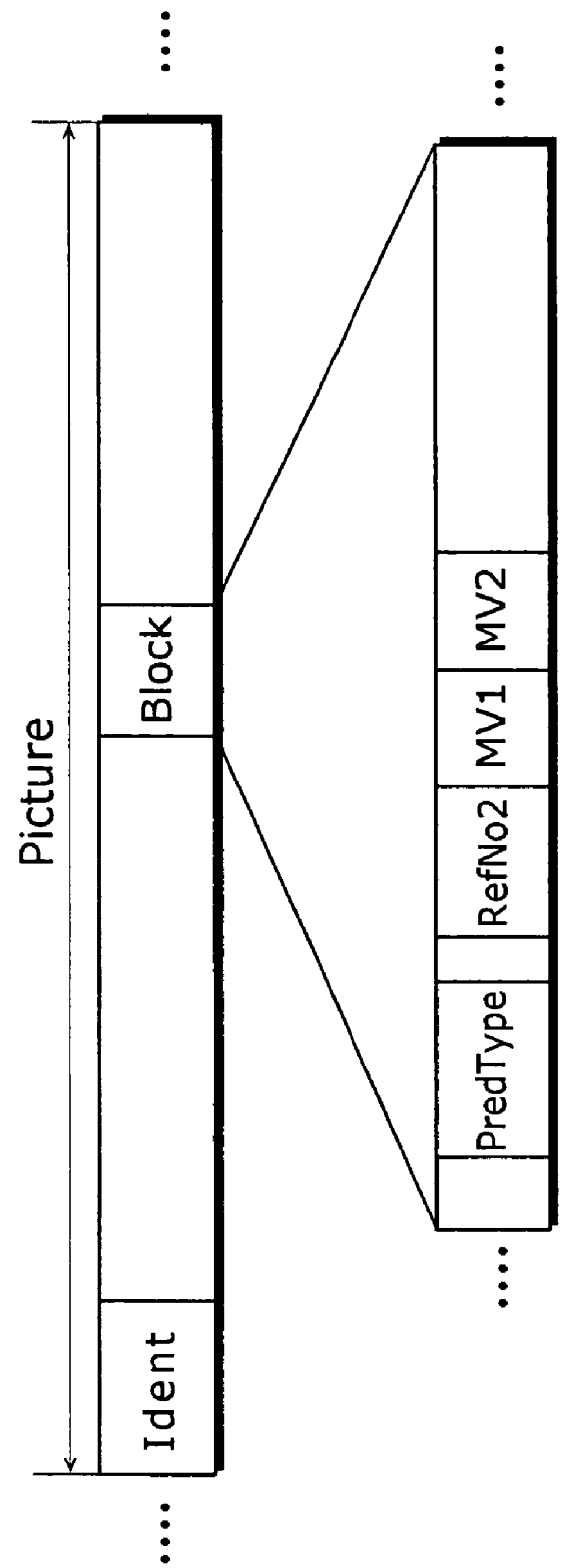
FIG. 12 is a conceptual diagram showing a data format of a coded moving picture according to the variation of the third embodiment.

FIG. 11 is a block diagram showing the moving picture coding apparatus used for this case. The default reference picture number generation unit 203 outputs an identifier Ident indicating a method of selecting a default reference picture to the variable length coding unit 204, as shown in FIG. 11. The variable length coding unit 204 performs variable length coding on the coded residual data ERes, the prediction type PredType, the reference picture RefNo2, the motion vectors MV1 and MV2 as well as the identifier Ident and outputs them as coded moving picture data Str3. The data format for this case includes an identifier Ident for indicating a method of selecting a default reference picture as shown in FIG. 12 instead of the default reference picture number DefRefNo that is information directly specifying a default reference picture as shown in FIG. 7.

Similarly, it is possible to code an identifier indicating a method of selecting, as a default reference picture, a picture whose coding order is the closest to that of the current picture out of the coded pictures stored in the multi-picture buffer, an identifier indicating a method of selecting, as a default reference picture, a picture which has display time information prior to that of the current picture and whose coding order is the closest to that of the current picture out of the coded pictures stored in the multi-picture buffer or an identifier indicating a method of selecting, as a default reference picture, a picture which has display time information subsequent to that of the current picture and whose coding order is the closest to that of the current picture. The coded moving picture data that is generated using this method can be decoded using the decoding method, having a structure according to the fourth embodiment, which will be explained below.

It is also possible to code the picture number DefRefNo itself indicating a default reference picture, as in FIG. 7, to code a differential value between the picture number of the current picture and the picture number of the picture selected as a default reference picture, or to code information such as a command for indicating a default reference picture.

Figure 13:
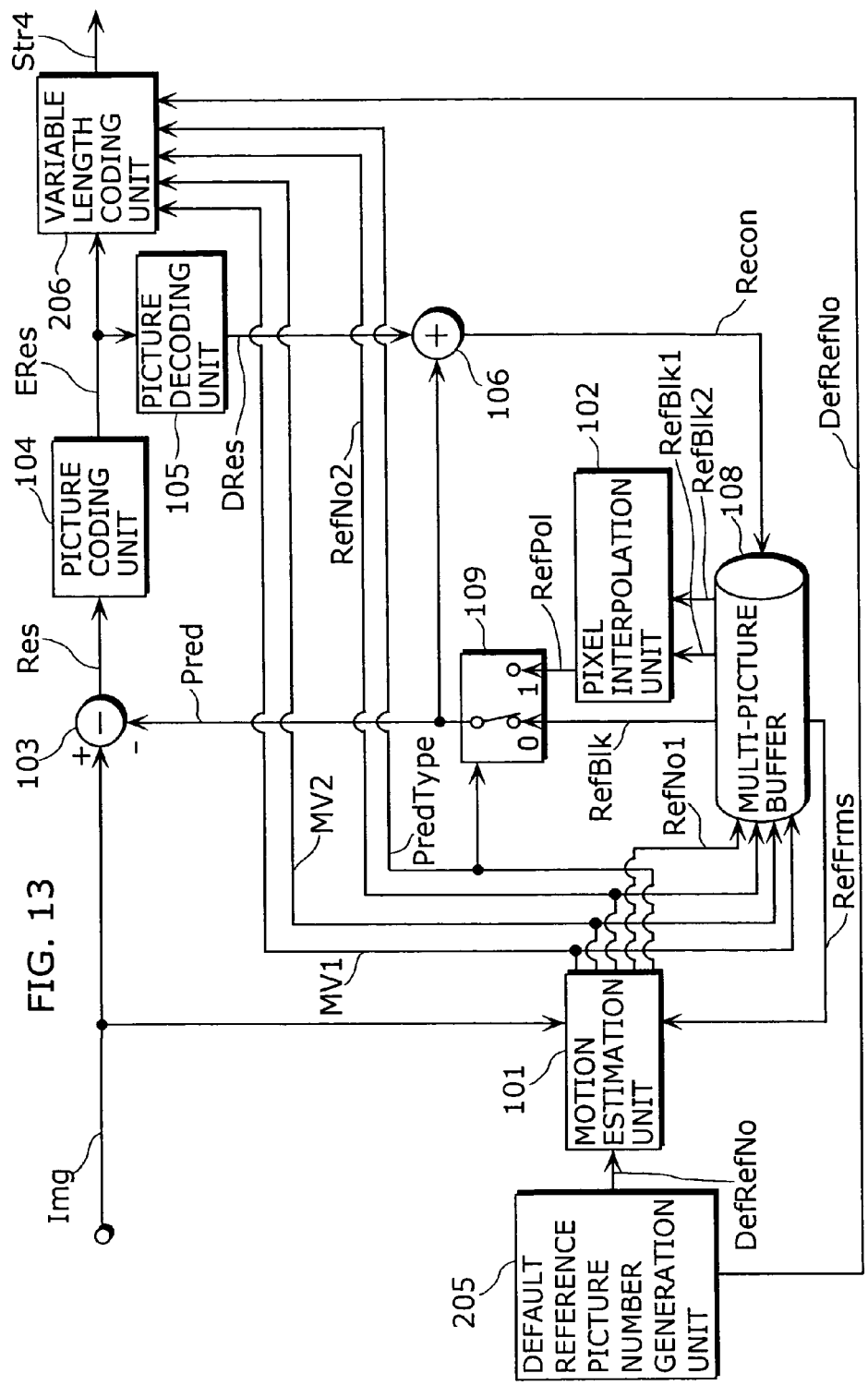
FIG. 13 is a block diagram showing a variation of the moving picture coding apparatus according to the third embodiment.

FIG. 13 is a block diagram showing a moving picture coding apparatus used for such case. The default reference picture number generation unit 205 outputs the default reference picture number DefRefNo to the variable length coding unit 206, as shown in FIG. 13. The variable length coding unit 206 performs variable length coding on the coded residual data ERes, the prediction type PredType, the reference picture number RefNo2, the motion vectors MV1, MV2 as well as the default reference picture number DefRefNo and outputs them as coded moving picture data Str4. The data format for this case is as same as the one shown in FIG. 7. The coded moving picture data generated using this method can be decoded with the use of the decoding method having the structure described in the second embodiment.

Fourth Embodiment

Figure 14:
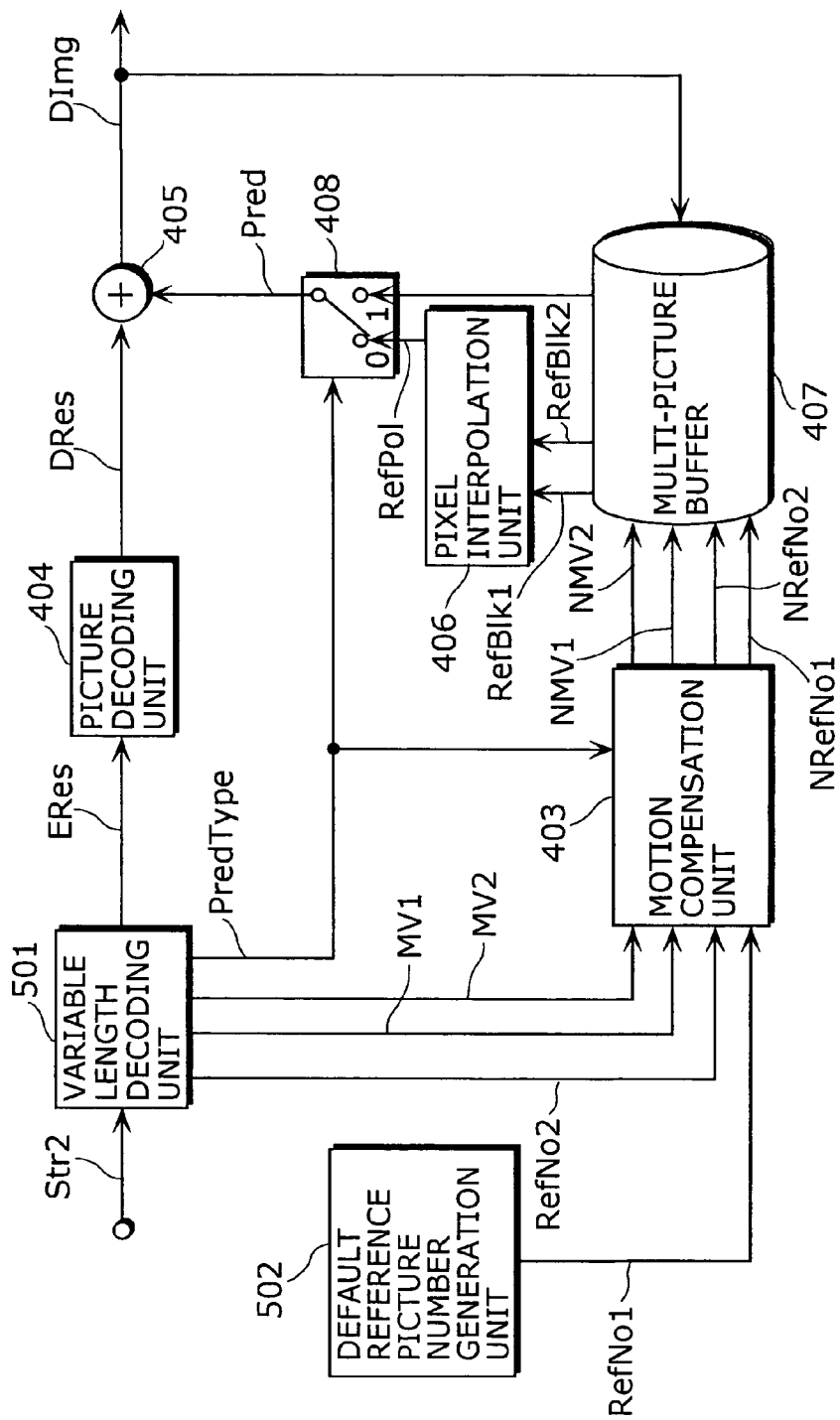
FIG. 14 is a block diagram showing a structure of a moving picture decoding apparatus according to a fourth embodiment.

FIG. 14 is a block diagram showing a moving picture decoding apparatus according to the fourth embodiment of the present invention. The same marks are used for the units and the data operating in the same manner as shown in the block diagram for the moving picture decoding apparatus according to the second embodiment in FIG. 8, and the description is abbreviated.

The moving picture decoding apparatus according to the present embodiment includes a default reference picture number generation unit 502 instead of the default reference picture number buffer 402 shown in the structure of the second embodiment. The variable length decoding unit 501 performs variable length decoding on the inputted coded moving picture data Str2 and outputs the coded residual data ERes, the prediction type PredType, the reference picture number RefNo2, and the motion vectors MV1, MV2. The default reference picture number generation unit 502 generates a default reference picture number DefRefNo in the same manner as the default reference picture number generation unit 201 described in the third embodiment and outputs, to the motion compensation unit 403, the default reference picture number DefRefNo as a reference picture number RefNo1.

According to the present embodiment as described above, it is possible to decode properly the coded moving picture data Str2 which is coded by the moving picture coding apparatus using the moving picture coding method according to the present invention described in the third embodiment.

The moving picture decoding apparatus is constructed as below when decoding the coded moving picture data Str3 in which the Identifier Ident for indicating a method of selecting a default reference picture is included, as illustrated in the variation of the third embodiment described above.

Figure 15:
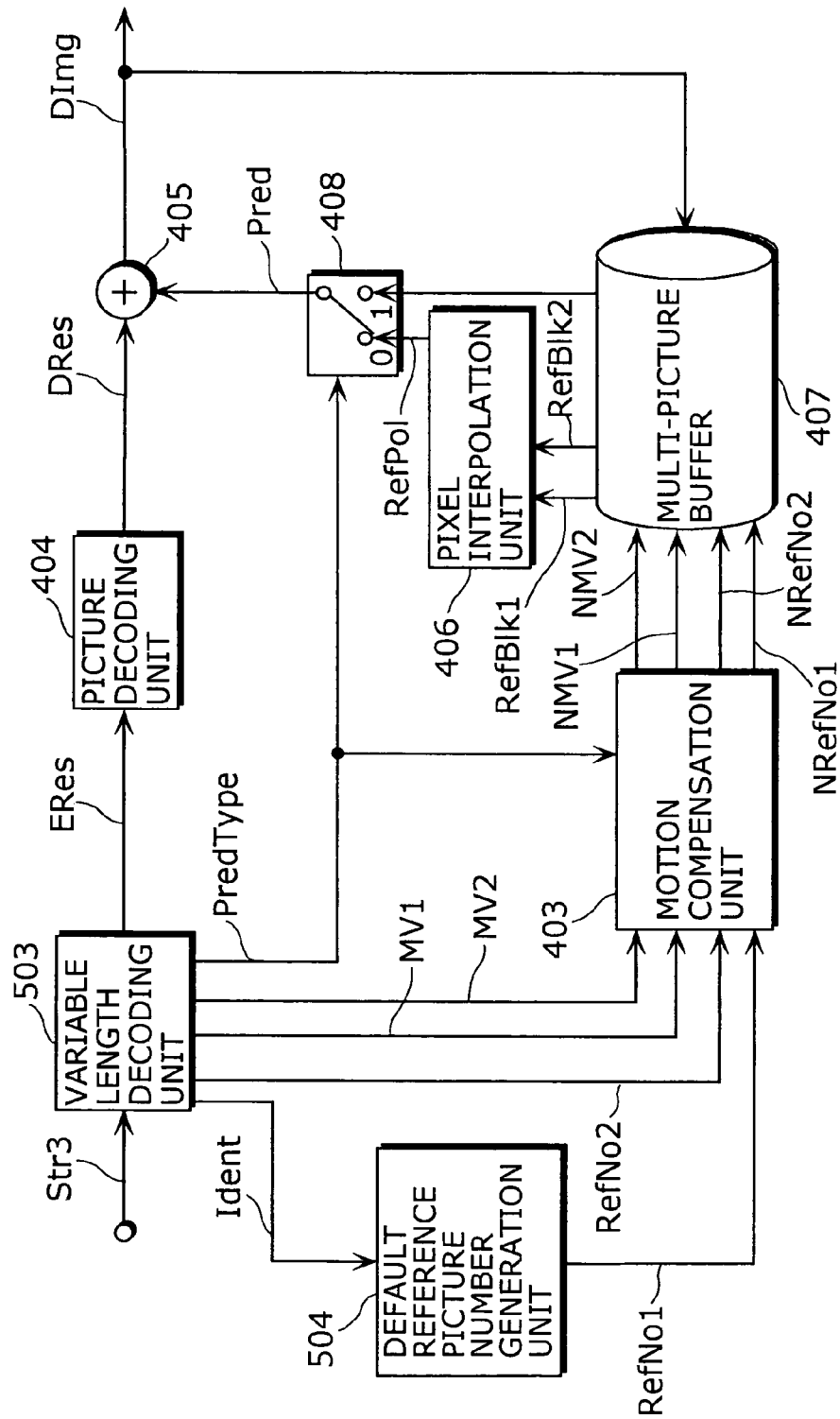
FIG. 15 is a block diagram showing a structure of a variation of the moving picture decoding apparatus according to the fourth embodiment.

FIG. 15 is a block diagram showing the moving picture decoding apparatus used for this case. The variable length decoding unit 503 performs variable length decoding on the inputted coded moving picture data Str3 and outputs the coded residual data ERes, the prediction type PredType, the reference picture number RefNo2, the motion vectors MV1, MV2 as well as the identifier Ident for indicating a method of selecting a default reference picture, as shown in FIG. 15. The default reference picture number generation unit 504 generates a default reference picture number DefRefNo using the method of selecting the default reference picture, indicated by the identifier inputted from the variable length decoding unit 503, and outputs, to the motion compensation unit 403, the default reference picture number DefRefNo as a reference picture number RefNo1.

Thus, it is possible to decode properly the coded moving picture data Str3, in which the identifier Ident for identifying a method of selecting a default reference picture is included, as described above in the third embodiment.

Fifth Embodiment

The present embodiment describes coding using a direct mode when coding is performed with reference only to the pictures, each of which has display order information that is prior to that of the current picture.

Figure 16:
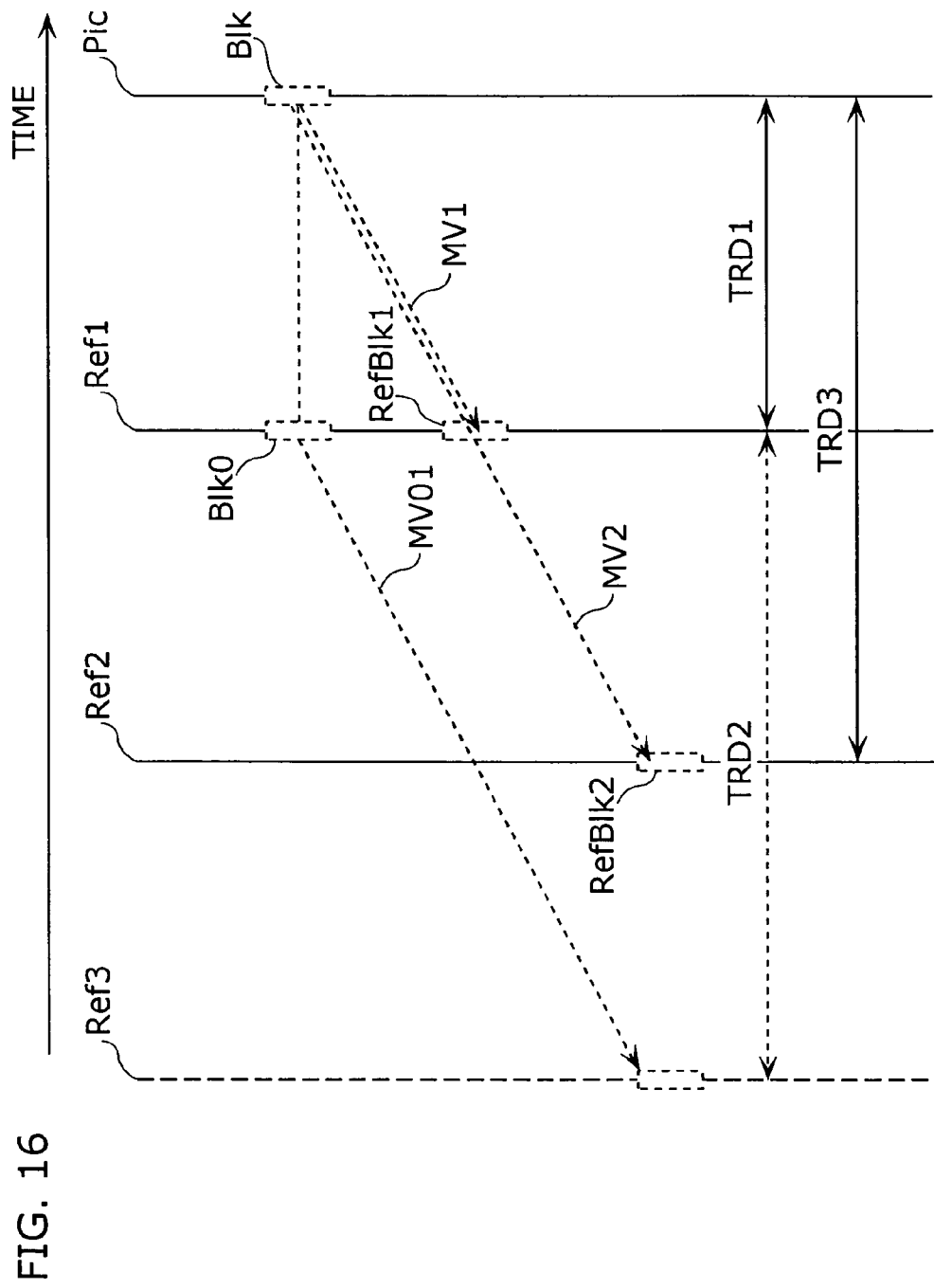
FIG. 16 is an illustration of a direct mode according to a fifth embodiment, with the use of plural reference pictures respectively having information on a display time which is earlier than that of a current picture.

FIG. 16 is a diagram illustrating a direct mode using plural reference pictures, each of which has display order information prior to that of the current picture, according to the fifth embodiment of the present invention. Here, a picture Pic represents a current picture to be coded, pictures Ref1 and Ref2 represent reference pictures, a block Blk represents a current block to be coded and a block Blk0 represents a block in the reference picture Ref1, which is co-located with the current block Blk. A motion vector MV01 represents a forward reference picture that is used for coding the block Blk0, a picture Ref3 represents a reference picture used by the motion vector MV01, a motion vector MV1 represents a motion vector with respect to the reference picture Ref1, a motion vector MV2 represents a motion vector with respect to the reference picture Ref2, a block RefBlk1 represents a reference block which is referred to by the motion vector MV1, and a block RefBlk2 represents a reference block which is referred to by the motion vector MV2.

For the reference pictures, for example, pictures respectively having display order information which is prior to and is the closest and the second closest to that of the current picture, and which are selected from the coded pictures stored in the multi-picture buffer. In this case, assuming that TRD1 represents a differential value between the display order information of the current picture Pic and that of the reference picture Ref1, TRD2 represents a differential value between the display order information of the reference picture Ref1 and that of the reference picture Ref3, and TRD3 represents a differential value between the display order information of the current picture Pic and that of the reference picture Ref2, the motion vectors MV1 and MV2 to be used for coding the current block can be calculated using the following equations.

$$MV1 = MV01 \times (TRD1/TRD2) \quad \text{(Equation A)}$$

$$MV2 = MV01 \times (TRD3/TRD2) \quad \text{(Equation B)}$$

By using the method described above, the reference pictures and the motion vectors in the case of using a direct mode can be determined.

In the H.264 described above, a method for explicitly controlling pictures to be stored in the multi-picture buffer by including control information for storing and removing the coded pictures in and from the multi-picture buffer in the coded moving picture data is discussed. Under such control, there might be a case in which only the pictures having display order information subsequent to that of the current picture are stored in the multi-picture buffer. The following describes a method to realize a direct mode for a picture to which a plural reference picture interpolation prediction is applied, when only the pictures having display order information which is subsequent to that of the current picture are stored in the multi-picture buffer.

Figure 17:
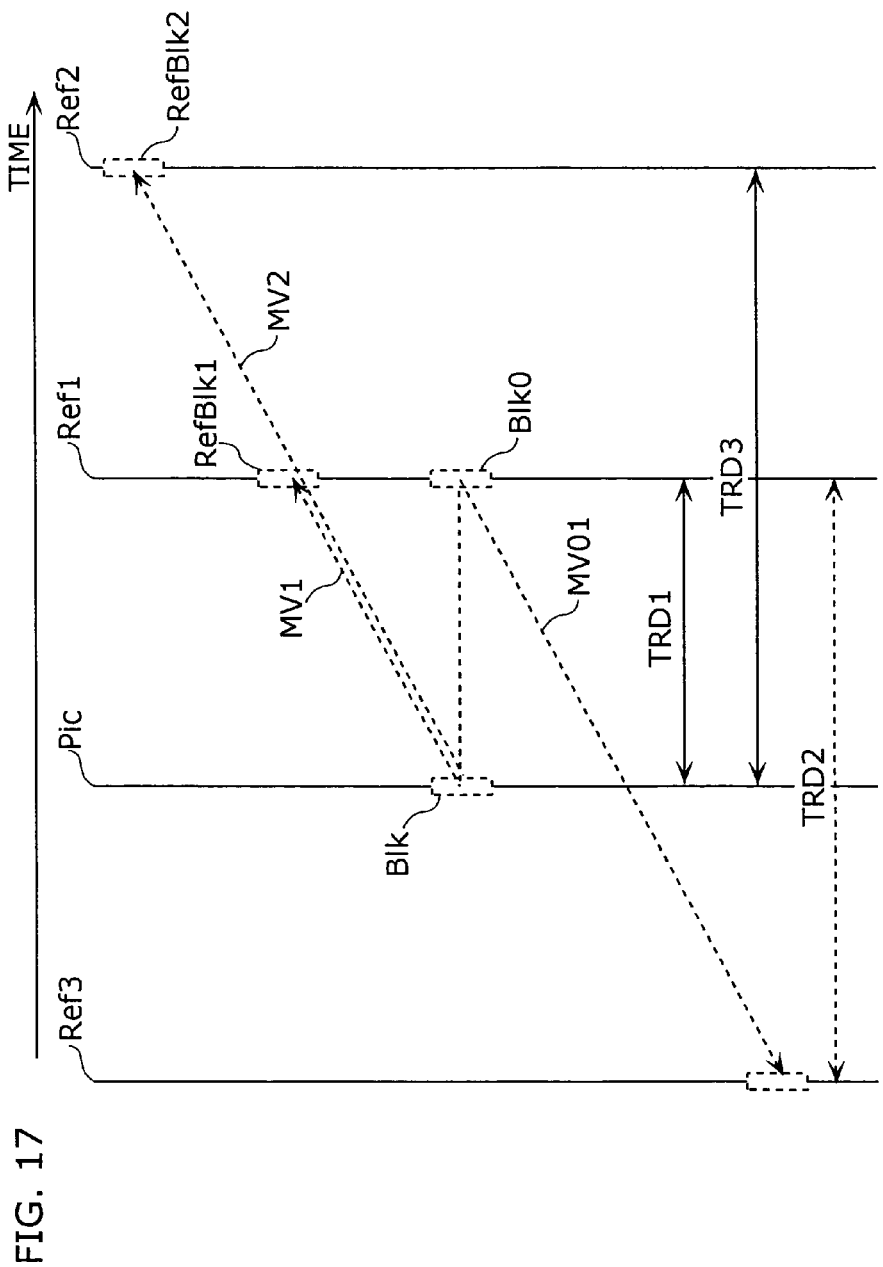
FIG. 17 is an illustration of a direct mode according to the fifth embodiment, with the use of plural reference pictures respectively having information on a display time which is later than that of the current picture.

FIG. 17 is an illustration showing a direct mode using plural reference pictures respectively having display order information which is subsequent to that of the current picture, according to the fifth embodiment of the present invention. Here, a picture Pic represents a current picture to be coded, pictures Ref1 and Ref2 represent reference pictures, a block Blk represents a current block to be coded, a block Blk0 represents a block in the reference picture Ref1 co-located with the current block Blk. A motion vector MV01 represents a forward reference motion vector used for coding the block Blk0, a motion vector MV1 represents a motion vector with respect to the reference picture Ref1 and a motion vector MV2 represents a motion vector with respect to the reference picture Ref2, whereas a block RefBlk1 represents a reference block which is referred to by the motion vector MV1 and a block RefBlk2 represents a reference block which is referred to by the motion vector MV2.

For the reference pictures, for example, a picture having display order information which is subsequent to and is the closest and the second closest to that of the current picture are selected from the coded pictures stored in the multi-picture buffer. In this case, assuming that TRD1 represents a differential value between the display order information of the current picture Pic and that of the reference picture Ref1, TRD2 represents a differential value between the display order information of the reference picture Ref1 and that of the reference picture Ref3 and TRD3 represents a differential value between the display order information of the current picture Pic and that of the reference picture Ref2, the motion vectors MV1 and MV2 to be used for coding the current block can be calculated using the following equations (Equation C) and (Equation D).

$$MV1 = -MV01 \times (TRD1/TRD2) \quad \text{(Equation C)}$$

$$MV2 = -MV01 \times (TRD3/TRD2) \quad \text{(Equation D)}$$

By using the method described above, the reference pictures and the motion vectors in the case of using a direct mode can be determined.

The processing of the direct mode as described above performed by the moving picture coding apparatus shown in FIG. 6 is executed by the motion estimation unit 101. Similarly, the one performed by the moving picture decoding apparatus shown in FIG. 8 is executed by the motion compensation unit 403.

Thus, the moving picture coding apparatus operable for the direct mode as described in the present embodiment allows the use of the direct mode even when the multi-picture buffer stores only the coded pictures having display order information that is prior to or subsequent to that of the current picture, and therefore, can improve the coding efficiency since the reference pictures and the motion vectors can be omitted. The moving picture decoding apparatus operable for the direct mode described in the present embodiment can decode the coded moving picture data outputted by the moving picture coding apparatus operable for the direct mode described in the present embodiment.

A skip mode can be defined as a case in which coded residual data ERes obtained by the inter-picture prediction using the reference pictures and the motion vectors calculated using a direct mode according to the present embodiment is "0". The direct mode according to the present embodiment allows the use of the direct mode even when the multi-picture buffer has only the coded pictures having display order information which is prior to or subsequent to that of the current picture, therefore, a skip mode can be selected for such case. The moving picture decoding apparatus operable for the skip mode described above allows the use of the skip mode and therefore can improve the coding efficiency. The moving picture decoding apparatus operable for the direct mode described in the present embodiment can decode the coded moving picture data outputted by the moving picture coding apparatus operable for the direct mode described in the present embodiment.

In the above description for FIGS. 16 and 17, a motion vector with respect to the reference picture Ref1 can be selected freely and a differential vector between the motion vector and the motion vector MV2 described above can be coded as well. Similarly, a motion vector with respect to the reference picture Ref2 can be selected freely and a differential vector between the motion vector and the motion vector MV2 described above can be also coded.

In the present embodiment, the skip mode described in the present embodiment is used when the multi-picture buffer has only the coded pictures having display order information which is prior to or subsequent to that of the current picture. However, a picture having display order information which is the closest and the second closest to that of the current picture may be selected from the pictures stored in the multi-picture buffer. The procedure may be modified so that the skip mode described in the present embodiment is adapted to the case in which the two selected pictures are the pictures having display order information which is prior to or subsequent to that of the current picture.

Sixth Embodiment

In the H.264 as described above, a skip mode for a picture to which a plural reference picture interpolation prediction is applied indicates that the coded residual data resulted from the inter-picture prediction using a direct mode is "0". In contrast, the moving picture coding apparatus and the moving picture decoding apparatus of the present invention employ, as a prediction method to be used for a skip mode, an inter-picture prediction using a reference picture having display order information that is the closest to that of the current picture out of the coded pictures in the multi-picture buffer.

Figure 18:
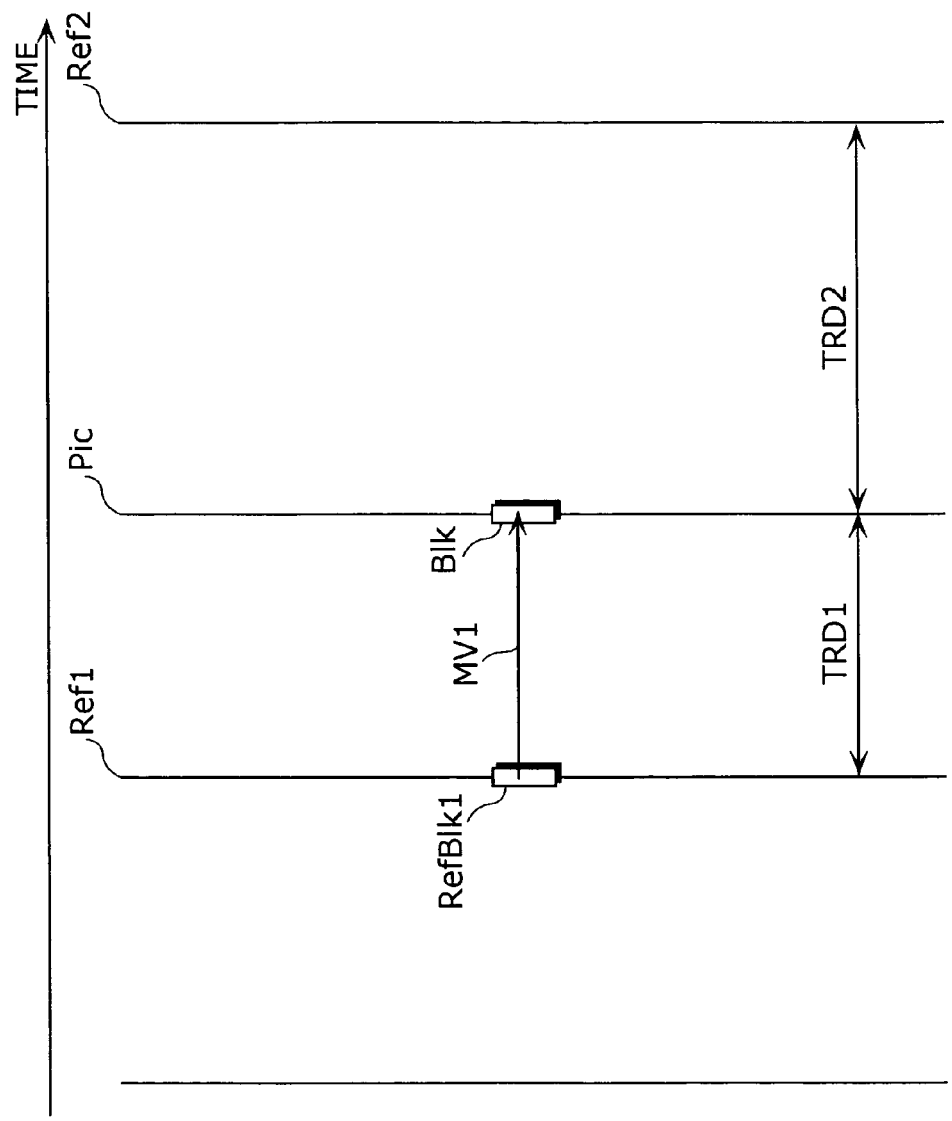
FIG. 18 is an illustration of an inter-picture prediction using a skip mode according to a sixth embodiment.

FIG. 18 is an illustration showing the inter-picture prediction in the case of using the skip mode according to the sixth embodiment of the present invention. Here, a picture Pic represents a current picture to be coded, a picture Ref1 represents a coded picture having display order information immediately prior to that of the current picture, a picture Ref2 is a coded picture having display order information immediately subsequent to that of the current picture, a block Blk is a current block to be coded, a motion vector MV1 represents a motion vector indicating "0" value with respect to the picture Ref1 and a block RefBlk1 represents a reference block referred to by the motion vector MV1. Also, TRD1, a differential value between the display order information of the current picture Pic and that of the picture Ref1, shall be smaller than TRD2, a differential value between the display order information of the current picture Pic and that of the picture Ref2.

In the present embodiment, a picture having display order information which is the closest to that of the current picture is used as a reference picture. In FIG. 18, a picture having display order information which is the closest to that of the current picture is a picture Ref1. The motion vector MV1 with respect to the picture Ref1 indicates "0" both in vertical and horizontal components within the picture and uses the reference block RefBlk1, which is referred to by the motion vector MV1, as a predictive image. By using such a prediction method, the reference pictures and the motion vectors are uniquely determined by the moving picture coding apparatus and the moving picture decoding apparatus, therefore, there is no need to include the information indicating reference pictures as well as motion vectors in the coded moving picture data. With the definition of the skip mode as the case in which the coded residual data obtained as a result of the inter-picture prediction described above is "0", only the prediction type indicating a skip mode may be included in the coded data for the block to which a skip mode is applied and then transmitted.

In the present embodiment, a picture having display order information which is the closest to that of the current picture, out of the coded pictures stored in the multi-picture buffer, is determined as a reference picture. However, a picture having display order information which is prior to and the closest to that of the current picture, out of the coded pictures in the multi-picture buffer, may be determined as a reference picture.

Also, in the present embodiment, a picture having display order information which is the closest to that of the current picture, out of the coded pictures stored in the multi-picture buffer, is determined as a reference picture. However, a picture having display order information which is subsequent to and the closest to that of the current picture, out of the coded pictures in the multi-picture buffer, may be also determined as a reference picture.

The display order information of pictures used in each of the above embodiments may be either a value indicating the time to display the pictures or information indicating a relative relation in display order of the pictures.

The picture mentioned above means both a frame and a field: a frame is used for frame coding, whereas a field is used for interlace coding (field coding).

In each of the above embodiments, the same processing can be performed even in the case of interlace coding for coding a picture as two fields, a top field and a bottom field. In the interlace coding, the coding efficiency can be further achieved since the reference picture number doubles. In this case, a picture having the same attribute as the current picture may be used as a priority. Namely, when a current picture is a top field, a top field is prioritized to be used as a picture indicated by the default reference picture number DefRefNo. On the other hand, when a current picture is a bottom field, a bottom field is prioritized to be used as a picture indicated by the default reference picture number DefRefNo.

Seventh Embodiment

Furthermore, the processing shown in each of the above embodiments can be carried out easily in an independent computer system by recording a program for realizing the picture coding/decoding method described in each of the above embodiments onto a recording medium such as a flexible disk or the like.

Figure 19A:
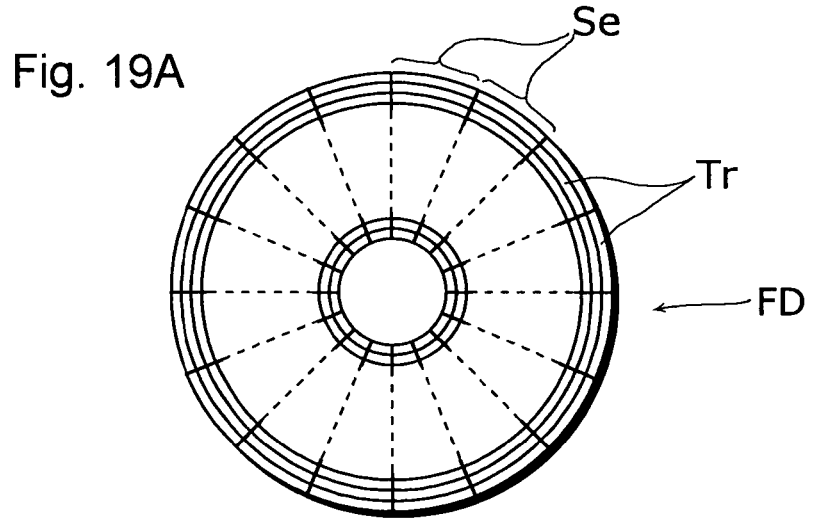
FIGS. 19A, 19B and 19C are illustrations of a recording medium for storing a program for realizing the moving picture coding method or the moving picture decoding method according to each of the embodiments in a computer system.
Figure 19B:
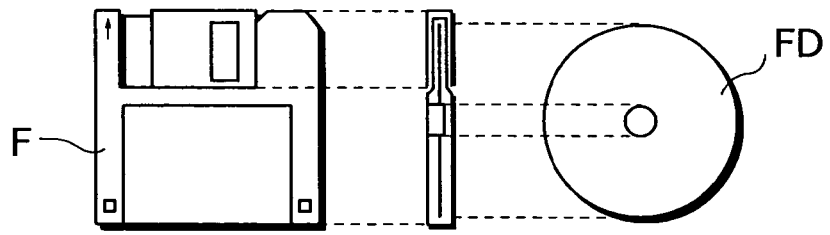
Figure 19C:
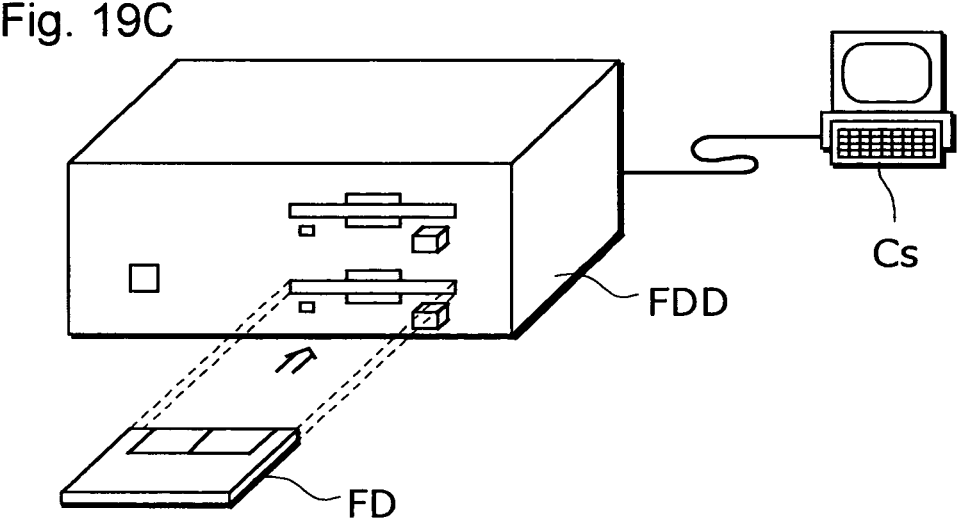

FIGS. 19A, 19B and 19C are illustrations of a recording medium for recording a program for realizing the coding/decoding method described in the above embodiments in the computer system.

FIG. 19B shows a full appearance of a flexible disk, its structure at a cross section and the flexible disk itself, whereas FIG. 19A shows an example of a physical format of the flexible disk as a main body of a recording medium. A flexible disk FD is contained in a case F with a plurality of tracks Tr formed concentrically from the periphery to the inside on the surface of the disk, and each track is divided into 16 sectors Se in the angular direction. Thus, the program is stored in an area assigned for it on the flexible disk FD.

FIG. 19C shows a configuration for recording and reproducing the program on the flexible disk FD. When the program is recorded on the flexible disk FD, the computer system Cs writes in the program via a flexible disk drive FDD. When the coding apparatus and the decoding apparatus are constructed in the computer system using the program on the flexible disk, the program is read out from the flexible disk and then transferred to the computer system by the flexible disk drive FDD.

The above explanation is made on an assumption that a recording medium is a flexible disk, but the same processing can also be performed using an optical disk. In addition, the recording medium is not limited to a flexible disk and an optical disk, but any other medium such as an IC card and a ROM cassette capable of recording a program can be used.

The following is a description for the applications of the picture coding/decoding method illustrated in the above-mentioned embodiments and a system using them.

Figure 20:
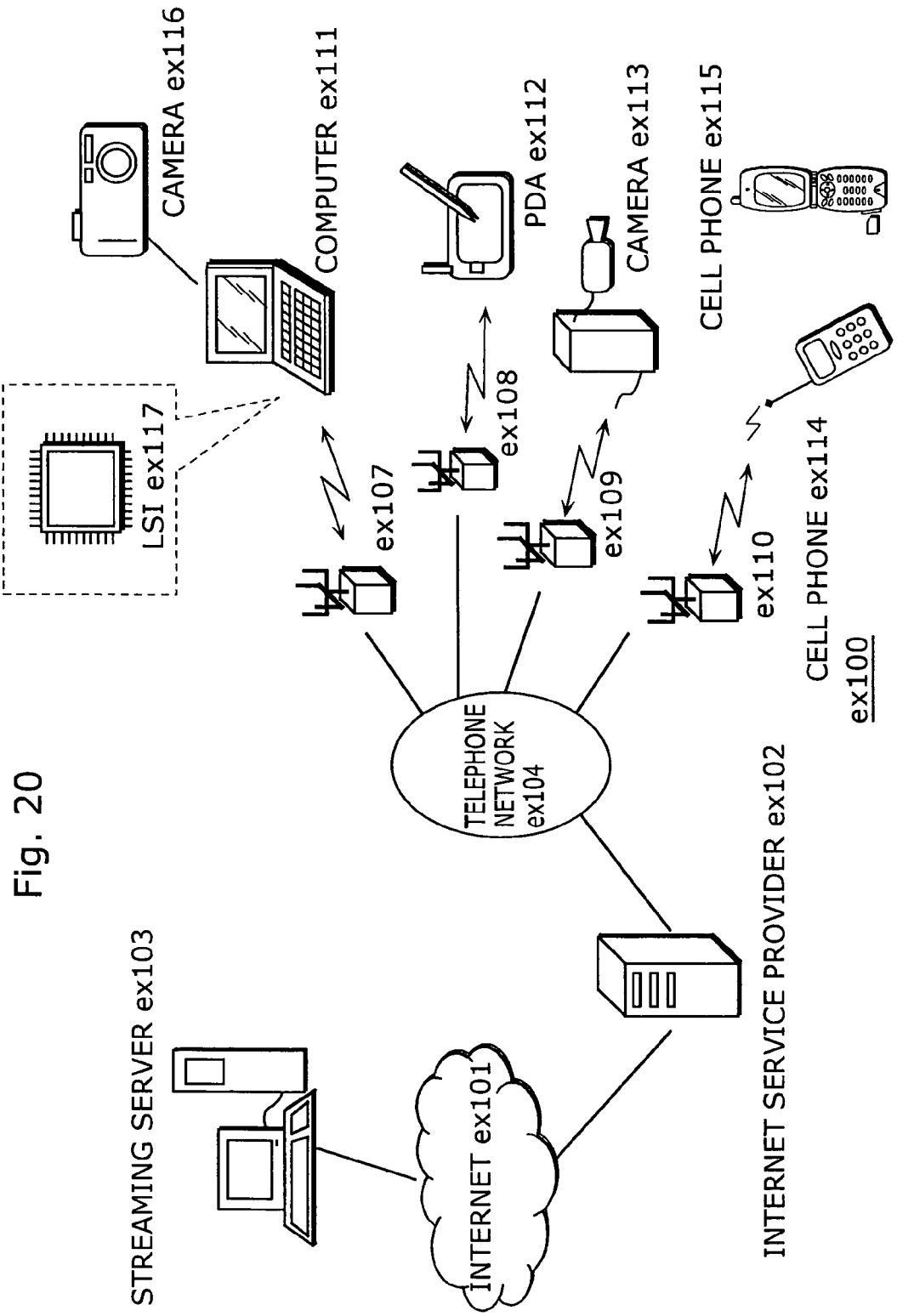
FIG. 20 is a block diagram showing a whole configuration of a content delivery system for realizing a content delivery service.

FIG. 20 is a block diagram showing an overall configuration of a content supply system ex100 for realizing content delivery service. The area for providing communication service is divided into cells of desired size, and cell sites ex107~ex110, which are fixed wireless stations, are placed in respective cells.

This content supply system ex100 is connected to apparatuses such as a computer ex111, a Personal Digital Assistant (PDA) ex112, a camera ex113, a cell phone ex114 and a cell phone with a camera ex115 via, for example, Internet ex101, an Internet service provider ex102, a telephone network ex104, as well as the cell sites ex107~ex110.

However, the content supply system ex100 is not limited to the configuration shown in FIG. 20 and may be connected to a combination of any of them. Also, each apparatus may be connected directly to the telephone network ex104, not through the cell sites ex107~ex110.

The camera ex113 is an apparatus capable of shooting video such as a digital video camera. The cell phone ex114 may be a cell phone of any of the following system: a Personal Digital Communications (PDC) system, a Code Division Multiple Access (CDMA) system, a Wideband-Code Division Multiple Access (W-CDMA) system or a Global System for Mobile Communications (GSM) system, a Personal Handyphone System (PHS), or the like.

A streaming server ex103 is connected to the camera ex113 via the telephone network ex104 and also the cell site ex109, which realizes a live distribution or the like using the camera ex113 based on the coded data transmitted from the user. Either of the camera ex113, the server which transmits the data and the like may code the data. The moving picture data shot by a camera ex116 may be transmitted to the streaming server ex103 via the computer ext111. In this case, either the camera ex116 or the computer ext111 may code the moving picture data. An LSI ex117 included in the computer ext11 and the camera ex116 performs the coding processing. Software for coding and decoding pictures may be integrated into any type of recording medium (such as a CD-ROM, a flexible disk and a hard disk) that is a recording medium which is readable by the computer ex111 or the like. Furthermore, a cell phone with a camera ex115 may transmit the moving picture data. This moving picture data is the data coded by the LSI included in the cell phone ex115.

The content supply system ex100 codes contents (such as a music live video) shot by a user using the camera ex113, the camera ex116 or the like in the same way as shown in the above-mentioned embodiments and transmits them to the streaming server ex103, while the streaming server ex103 makes stream delivery of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting.

When each apparatus in this system performs coding or decoding, the picture coding apparatus or the picture decoding apparatus shown in the above-mentioned embodiment can be used.

A cell phone will be explained as an example of such apparatus.

Figure 21:
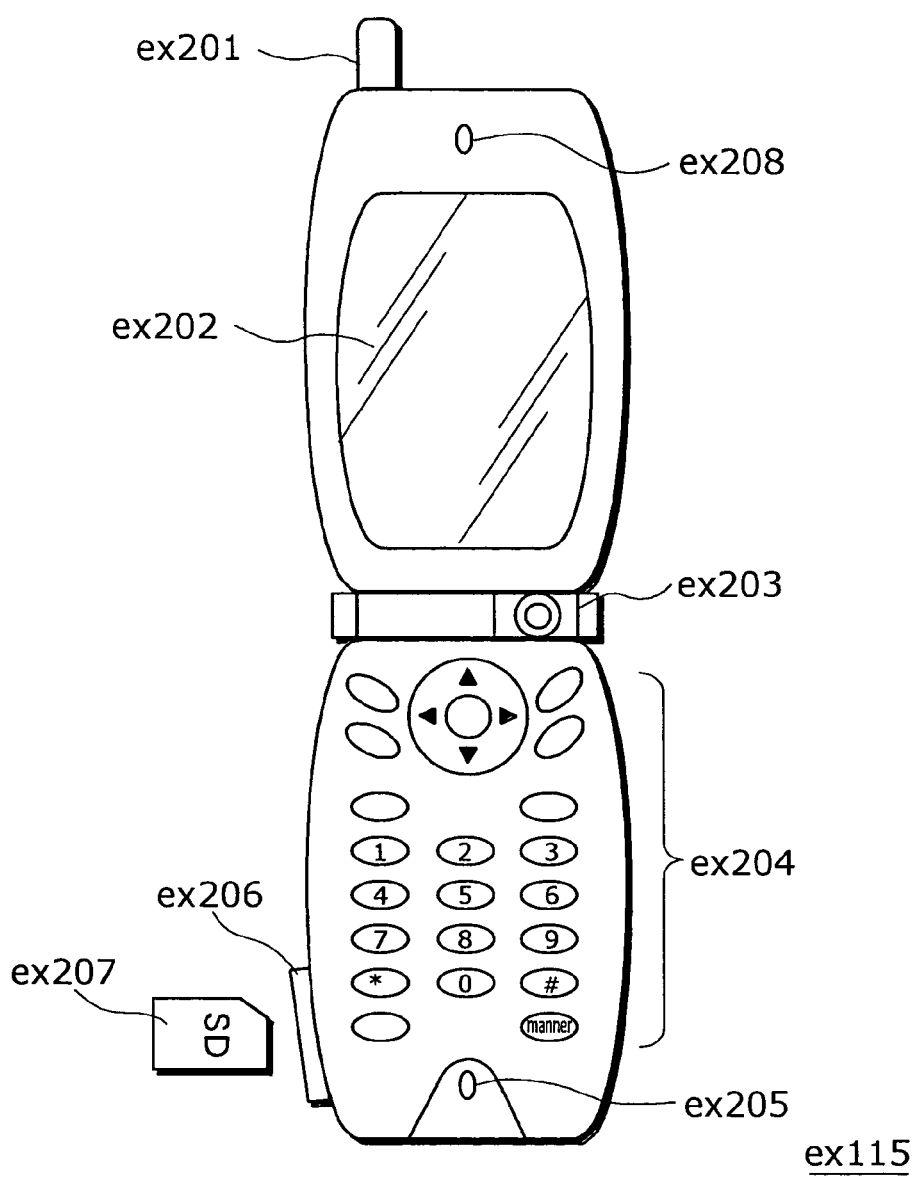
FIG. 21 is a sketch showing an example of a cell phone.

FIG. 21 is a diagram showing the cell phone ex115 using the picture coding/decoding method explained in the above-mentioned embodiments. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, a voice output unit ex208 such as a speaker for outputting voice, a voice input unit ex205 such as a microphone for inputting voice, a recording medium ex207 for recording coded or decoded data such as data of moving or still pictures shot by the camera, data of received e-mails and that of moving or still pictures, and a slot unit ex206 for attaching the recording medium ex207 to the cell phone ex115. The recording medium ex207 stores in itself a flash memory element, a kind of Electrically Erasable and Programmable Read Only Memory (EEPROM) that is a non-volatile memory electrically erasable from and rewritable to a plastic case such as an SD card.

Next, the cell phone ex115 will be explained with reference to FIG. 22. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, a Liquid Crystal Display (LCD) control unit ex302, a picture decoding unit ex309, a multiplexing/demultiplexing unit ex308, a read/write unit ex307, a modem circuit unit ex306 and a voice processing unit ex305 via a synchronous bus ex313.

When a call-end key or a power key is turned ON by a user's operation, the power supply circuit unit ex310 supplies the respective units with power from a battery pack so as to activate the digital cell phone with a camera ex115 as a ready state.

In the cell phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing for the digital voice data, and the communication circuit unit ex301 performs digital-to-analog conversion and frequency conversion for the data, so as to transmit it via the antenna ex201. Also, in the cell phone ex115, the communication circuit unit ex301 amplifies the data received by the antenna ex201 in conversation mode and performs frequency conversion and the analog-to-digital conversion to the data, the modem circuit unit ex306 performs inverse spread spectrum processing of the data, and the voice processing unit ex305 converts it into analog voice data so as to output it via the voice output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs the digital-to-analog conversion and the frequency conversion for the text data, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture coding unit ex312, which includes the picture coding apparatus as described for the present invention, compresses and codes the picture data supplied from the camera unit ex203 using the coding method employed by the picture coding apparatus as shown in the embodiments mentioned above so as to transform it into coded image data, and sends it out to the multiplexing/demultiplexing unit ex308. At this time, the cell phone ex115 sends out the voice received by the voice input unit ex205 during the shooting with the camera unit ex203 to the multiplexing/demultiplexing unit ex308 as digital voice data via the voice processing unit ex305.

The multiplexing/demultiplexing unit ex308 multiplexes the coded image data supplied from the picture coding unit ex312 and the voice data supplied from the voice processing unit ex305, using a predetermined method, then the modem circuit unit ex306 performs spread spectrum processing of the multiplexed data obtained as a result of the multiplexing, and lastly the communication circuit unit ex301 performs digital-to-analog conversion and frequency transform of the data for the transmission via the antenna ex201.

As for receiving data of a moving picture file which is linked to a Web page or the like in data communication mode, the modem circuit unit ex306 performs inverse spread spectrum processing for the data received from the cell site ex110 via the antenna ex201, and sends out the multiplexed data obtained as a result of the inverse spread spectrum processing.

In order to decode the multiplexed data received via the antenna ex201, the multiplexing/demultiplexing unit ex308 demultiplexes the multiplexed data into a coded stream of image data and that of voice data, and supplies the coded image data to the picture decoding unit ex309 and the voice data to the voice processing unit ex305, respectively via the synchronous bus ex313.

Next, the picture decoding unit ex309, including the picture decoding apparatus as described in the present invention, decodes the coded stream of the image data using the decoding method corresponding to the coding method as shown in the above-mentioned embodiments to generate reproduced moving picture data, and supplies this data to the display unit ex202 via the LCD control unit ex302, and thus the image data included in the moving picture file linked to a Web page, for instance, is displayed. At the same time, the voice processing unit ex305 converts the voice data into analog voice data, and supplies this data to the voice output unit ex208, and thus the voice data included in the moving picture file linked to a Web page, for instance, is reproduced.

Figure 23:
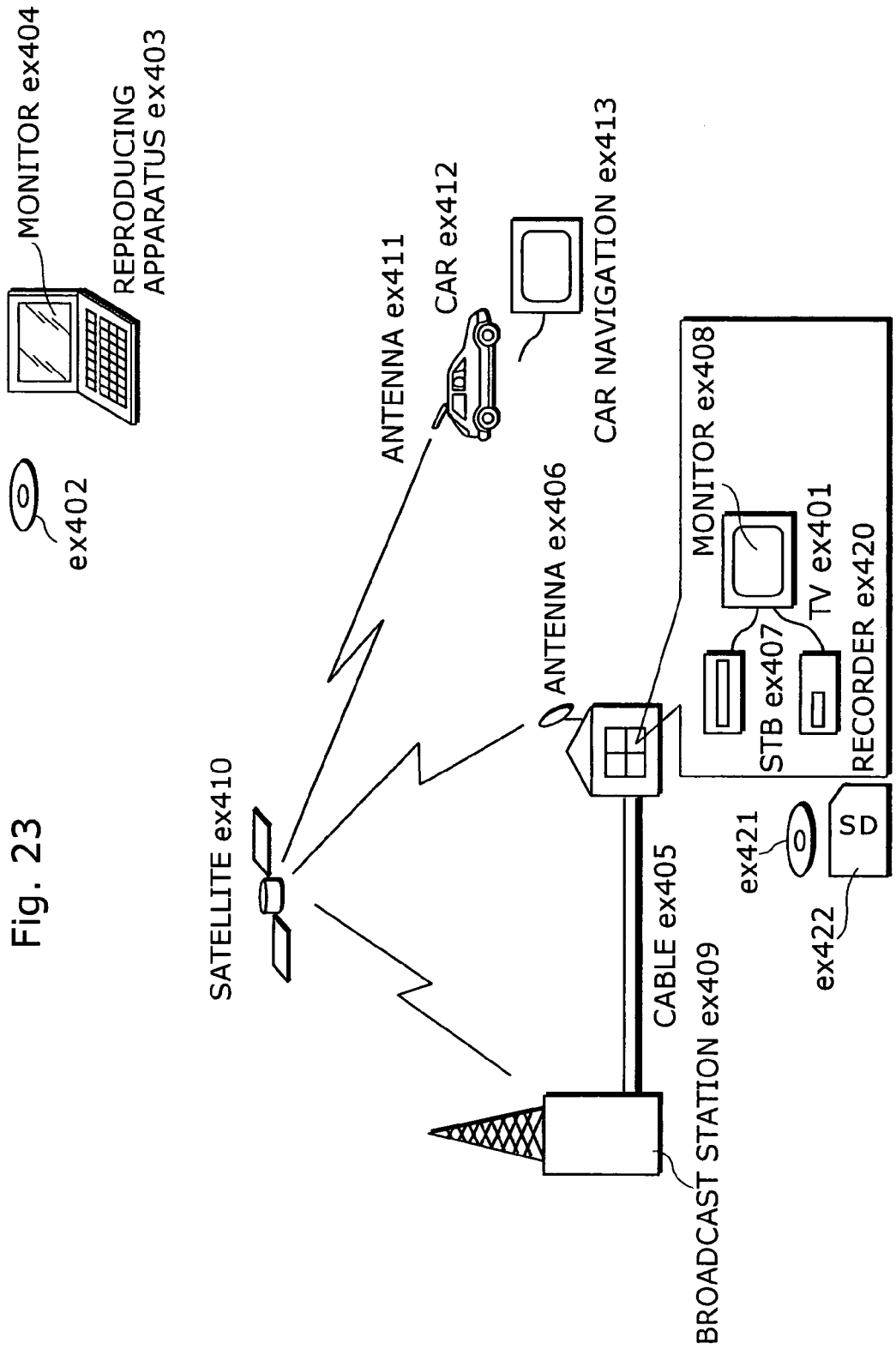
FIG. 23 is a block diagram showing a whole configuration of a digital broadcasting system.

The present invention is not limited to the above-mentioned system since ground-based or satellite digital broadcasting has been in the news lately and at least either the picture coding apparatus or the picture decoding apparatus described in the above-mentioned embodiments can be incorporated into a digital broadcasting system as shown in FIG. 23. More specifically, a coded stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a Set Top Box (STB) ex407 decodes a coded bit stream for reproduction. The picture decoding apparatus as shown in the above-mentioned embodiments can be implemented in the reproducing apparatus ex403 for reading out and decoding the coded stream recorded on a recording medium ex402 such as a CD and a DVD. In this case, the reproduced moving picture signals are displayed on a monitor ex404. It is also conceivable to implement the picture decoding apparatus in the STB ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the Set Top Box. Also, a car ex412 having an antenna ex411 can receive signals from the satellite ex410 or the cell site ex107 for replaying moving picture on a display device such as a car navigation system ex413 set in the car ex412.

Furthermore, the picture coding apparatus as shown in the above-mentioned embodiments can code picture signals and record them on the recording medium. As a concrete example, a recorder ex420 such as a DVD recorder for recording picture signals on a DVD disk ex421, a disk recorder for recording them on a hard disk can be cited. They can be recorded on an SD card ex422. When the recorder ex420 includes the picture decoding apparatus as shown in the above-mentioned embodiment, the picture signals recorded on the DVD disk ex421 or the SD card ex422 can be reproduced for display on the monitor ex408.

Figure 22:
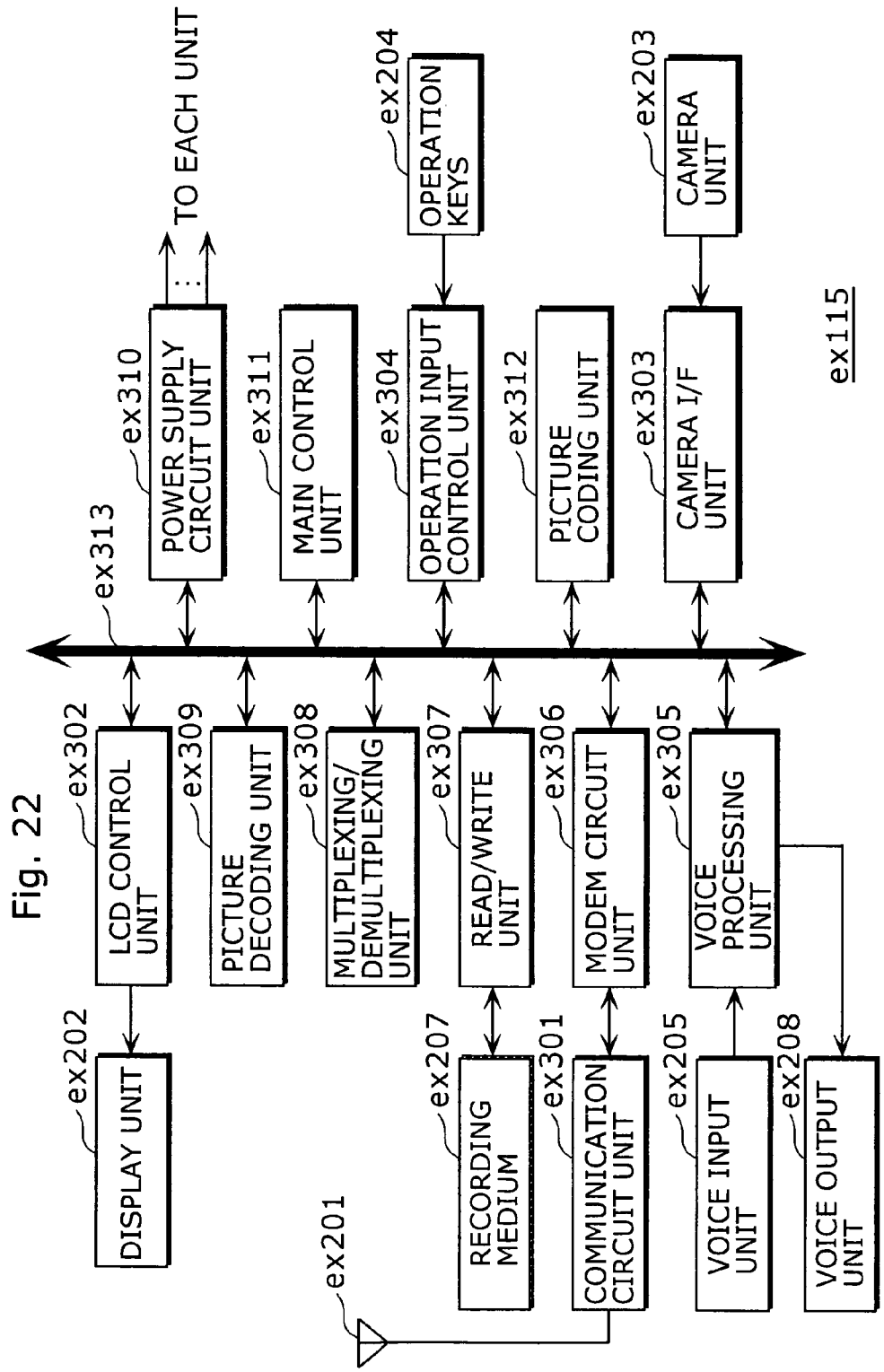
FIG. 22 is a block diagram showing an internal structure of the cell phone.

As for the structure of the car navigation system ex413, the structure without the camera unit ex203, the camera interface unit ex303 and the picture coding unit ex312, out of the components shown in FIG. 22, is conceivable. The same applies for the computer ex111, the television (receiver) ex401 and others.

In addition, three types of implementations can be conceived for a terminal such as the cell phone ex114: a sending/receiving terminal implemented with both an encoder and a decoder, a sending terminal implemented with an encoder only, and a receiving terminal implemented with a decoder only.

As described above, it is possible to use the picture coding method and the picture decoding method described in the above-mentioned embodiments for any of the above-mentioned apparatuses and systems, and by using these methods, the effects described in the above-mentioned embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

Thus, as described above in detail, with the moving picture coding method according to the present invention, there is no need to select, on a block-by-block basis, a single picture from plural coded pictures for one reference picture and also there is no need to code this reference picture on a block-by-block basis, therefore, the efficient coding can be realized and the processing burden can be reduced.

Using the moving picture decoding method according to the present invention also allows the coded moving picture data, which is encoded using a common reference picture and a reference picture according to each block and then outputted, to be decoded properly.

INDUSTRIAL APPLICABILITY

Thus, the moving picture coding method and the moving picture decoding method according to the present invention is practical as a method of coding each picture that composes an input moving picture, with the use of, for example, a cell phone, a DVD apparatus and a personal computer, or the like, outputting it as coded moving picture data and decoding the coded moving picture data.

The invention claimed is:

1. A picture coding method for dividing, into blocks, a current picture to be coded, selecting a reference picture from among reference pictures on a block basis, describing information which identifies the selected reference picture, and performing predictive coding on the block, said method comprising:

selecting, using a selection unit, for coding a plural-block image unit made up of a plurality of blocks, a common reference picture to be commonly referred to, from among plural reference pictures, the common reference picture being only one reference picture that is selected from among the plural reference pictures and is assigned commonly to each of the plurality of blocks of the plural-block image unit;

describing, using a common information description unit, common information which identifies the selected common reference picture, in a common information area for the plural-block image unit such that reference picture identification information for the selected common reference picture can be omitted for at least one of the plurality of blocks of the plural-block image unit, instead of describing, per block, reference picture identification information which identifies the selected common reference picture;

generating, using a predictive image generation unit, a predictive image of a current block to be coded included in the plural-block image unit, using the selected common reference picture; and coding, using a coding unit, the current block using the predictive image.

2. The picture coding method according to claim 1, wherein the plural-block image unit is one of a plural picture unit, a picture unit, and a slice unit.

* * * * *